United States Patent
Li et al.

(10) Patent No.: US 12,289,794 B2
(45) Date of Patent: Apr. 29, 2025

(54) METHODS OF MANAGING CONNECTIONS TO A LOCAL AREA DATA NETWORK (LADN) IN A 5G NETWORK

(71) Applicant: InterDigital Patent Holdings, Inc., Wilmington, DE (US)

(72) Inventors: Hongkun Li, Malvern, PA (US); Michael F. Starsinic, Newtown, PA (US); Rocco Di Girolamo, Laval (CA); Catalina Mihaela Mladin, Hatboro, PA (US); Chonggang Wang, Princeton, NJ (US); Dale N. Seed, Allentown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/045,554

(22) PCT Filed: Mar. 15, 2019

(86) PCT No.: PCT/US2019/022528
§ 371 (c)(1),
(2) Date: Oct. 6, 2020

(87) PCT Pub. No.: WO2019/194954
PCT Pub. Date: Oct. 10, 2019

(65) Prior Publication Data
US 2021/0168584 A1   Jun. 3, 2021

Related U.S. Application Data

(60) Provisional application No. 62/653,827, filed on Apr. 6, 2018.

(51) Int. Cl.
*H04W 48/18* (2009.01)
*H04W 8/06* (2009.01)
(Continued)

(52) U.S. Cl.
CPC .......... *H04W 8/065* (2013.01); *H04W 28/16* (2013.01); *H04W 48/18* (2013.01); *H04W 60/00* (2013.01)

(58) Field of Classification Search
CPC ..... H04W 8/065; H04W 28/16; H04W 48/18; H04W 60/00; H04W 72/1284; H04W 48/20
See application file for complete search history.

(56) References Cited

U.S. PATENT DOCUMENTS 9,188,460 B2   11/2015   Burton et al.
9,450,879 B2    9/2016   Rector
(Continued)

FOREIGN PATENT DOCUMENTS

CN   102685729 A   9/2012
CN   106507416 A   3/2017
(Continued)

OTHER PUBLICATIONS

3GPp, "3rd Generation Partnership Project; Technical Specification Group Core Network and Terminals; T8 reference point for Northbound APIs (Release 15)", 3GPP Draft, 3GPP TS 29 122 V1 0.0, Mar. 18, 2018, 152 pages.
(Continued)

*Primary Examiner* — Marcus Hammonds
(74) *Attorney, Agent, or Firm* — Flaster Greenberg P.C.

(57) ABSTRACT

Methods and apparatuses are described herein for configuration of background data transfers (BDTs) between local area data networks (LADNs). An apparatus may receive a message indicating a request from a user equipment (UE) for a data transfer of data originating from the UE. The apparatus may send, to a database, a request for subscription information associated with the UE and a policy profile associated with the UE to determine whether there is an
(Continued)

existing BDT policy. The apparatus may receive, from the database, a response indicating whether there is an existing BDT policy that can be re-used. The apparatus may determine, based on the received response, a BDT policy for the data transfer and a LADN to service the data transfer. The apparatus may send, to the LADN via a radio access network (RAN) node, a notification message of an arrival time and data rate for the data transfer.

16 Claims, 24 Drawing Sheets

(51) Int. Cl.
*H04W 28/16* (2009.01)
*H04W 60/00* (2009.01)

(56) References Cited

U.S. PATENT DOCUMENTS

| | | | | |
|---|---|---|---|---|
| 2007/0064633 | A1 | 3/2007 | Fricke | |
| 2012/0209946 | A1* | 8/2012 | McClure | H04N 21/4126 709/224 |
| 2013/0324124 | A1* | 12/2013 | Scribano | H04W 48/18 455/435.3 |
| 2014/0347984 | A1* | 11/2014 | Speks | H04L 41/0896 370/230 |
| 2014/0366042 | A1* | 12/2014 | Chan | G06F 1/3206 719/318 |
| 2017/0272972 | A1 | 9/2017 | Egner et al. | |
| 2018/0352516 | A1 | 12/2018 | McClure et al. | |
| 2019/0124671 | A1 | 4/2019 | Starsinic et al. | |
| 2019/0166016 | A1* | 5/2019 | Livanos | H04L 67/322 |
| 2019/0268230 | A1* | 8/2019 | Huang | H04L 47/20 |
| 2020/0022027 | A1* | 1/2020 | Iwai | H04L 12/14 |
| 2020/0029249 | A1* | 1/2020 | Livanos | H04W 8/02 |
| 2020/0186974 | A1 | 6/2020 | Palanisamy et al. | |
| 2020/0337093 | A1* | 10/2020 | Kim | H04W 64/00 |

FOREIGN PATENT DOCUMENTS

| | | |
|---|---|---|
| CN | 106576217 A | 4/2017 |
| CN | 107343294 A | 11/2017 |
| JP | 2006-523984 A | 10/2006 |
| JP | 2018-530193 A | 10/2018 |
| KR | 10-2018-0021636 A | 3/2018 |
| WO | 2013/192108 A2 | 12/2013 |
| WO | 2015/104751 A1 | 7/2015 |
| WO | 2016/209421 A1 | 12/2016 |
| WO | 2017/024005 A1 | 2/2017 |
| WO | WO 2017/175070 A1 | 10/2017 |

OTHER PUBLICATIONS

3GPP, "3rd Generation Partnership Project; Technical Specification Group Services and System Aspects; System Architecture for the 5G System; Stage 2 (Release 15)", 3GPP Draft, 3GPP TS 23.501 V15.1.0, Mar. 28, 2018, 201 pages.

Third Generation Partnership Project (3GPP), "General Packet Radio Service (GPRS) Enhancements for Evolved Universal Terrestrial Radio Access Network (E-UTRAN) Access", 3GPP TS 23.401 V15.0.0, Release 15, Jun. 2017, 386 pages.

Third Generation Partnership Project (3GPP), "Architecture Enhancements to Facilitate Communications with Packet Data Networks and Applications", 3GPP TS 23.682 V15.1.0, Release 15, Jun. 2017, 118 pages.

NGMN, "Description of Network Slicing Concept", Version 1.0, Jan. 13, 2016, 5G, 7 pages.

Third Generation Partnership Project (3GPP), "System Architecture for the 5G System", Stage 2, 3GPP TS 23.501 V15.0.0, Release 15, Dec. 2017, 181 pages.

Third Generation Partnership Project (3GPP), "Procedures for the 5G System", Stage 2, 3GPP TS 23.502 V15.0.0, Release 15, Dec. 2017, 258 pages.

Third Generation Partnership Project (3GPP), "Technical Specification Group Core Network and Terminals; T8 reference point for Northbound APIs (Release 15)", 3GPP TS 29.122 V0.6.0, Feb. 2018, 149 pages.

3$^{rd}$ Generation Partnership Project; "Update of NEF service for background data transfer", KDDI, et al., S2-18255, SA WG2 Meeting #126, Feb. 25-Mar. 2, 2018, 5 pages.

3$^{rd}$ Generation Partnership Project; "Technical Specification Group Services and System Aspects; Policy and Charging Control Framework for the 5G System; Stage 2 (Release 15)", 3GPP TS 23.503 V15.1.0, Mar. 2018, 65 pages.

* cited by examiner

METHODS OF MANAGING CONNECTIONS TO A LOCAL AREA DATA NETWORK (LADN) IN A 5G NETWORK

CROSS-REFERENCE TO RELATED APPLICATIONS

This application is the National Stage Application of International Patent Application No. PCT/US2019/022528, filed Mar. 15, 2019, which claims the benefit of U.S. Provisional Patent Application No. 62/653,827, filed Apr. 6, 2018, which is hereby incorporated by reference in its entirety.

BACKGROUND

Background data transfer (BDT) is a resource management mechanism to allow an application server (AS) to pre-configure a data transfer to user equipments (UEs) during a specific time period with a certain data rate. The long term evolution (LTE) evolved packet core (EPC) defines a procedure for a service capability server of AS to configure a BDT for mobile terminated (MT) traffic. A local are data network (LADN) may be defined as a data network (DN) that is accessible by a UE only in specific locations. Access to a DN via a packet data unit (PDU) session for an LADN may only be available in a specific LADN service area. An LADN service area may be a set of set of tracking areas. The 5G core (5GC) network may provide support for UEs to be made aware of the availability of an LADN based on the UE location.

A LADN may serve a specific area defined as a service area. A UE may repeatedly need to connect to an LADN, which may include for example a certain mobility pattern.

Some IoT device applications and IoT servers may only be able to operate when in the service area of an LADN. Moreover, a UE may want to send mobile originated (MO) traffic to an LADN and to pre-configure a BDT policy with a 5G network.

Accordingly, there is a need to define mechanisms allowing the device to schedule and perform the data transfer at different LADNs, such as for MO traffic.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein to allow a service capability server (SCS)/application server (AS) to configure and manage a background data transfer between local area data networks (LADNs)/data networks (DN). In accordance with one embodiment, an apparatus may receive a message that indicates a request from a user equipment (UE) for a data transfer of data originating from the UE. The apparatus may send, to a database, a request for subscription information associated with the UE and a policy profile associated with the UE to determine whether there is an existing background data transfer (BDT) policy. The apparatus may receive, from the database, a response indicating whether there is an existing BDT policy that can be re-used. The apparatus may determine, based on the received response, a BDT policy for the data transfer and a LADN to service the data transfer. The apparatus may send, to the LADN via a radio access network (RAN) node, a notification message of an arrival time and data rate for the data transfer.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF ILLUSTRATIVE EMBODIMENTS

Figure 1:
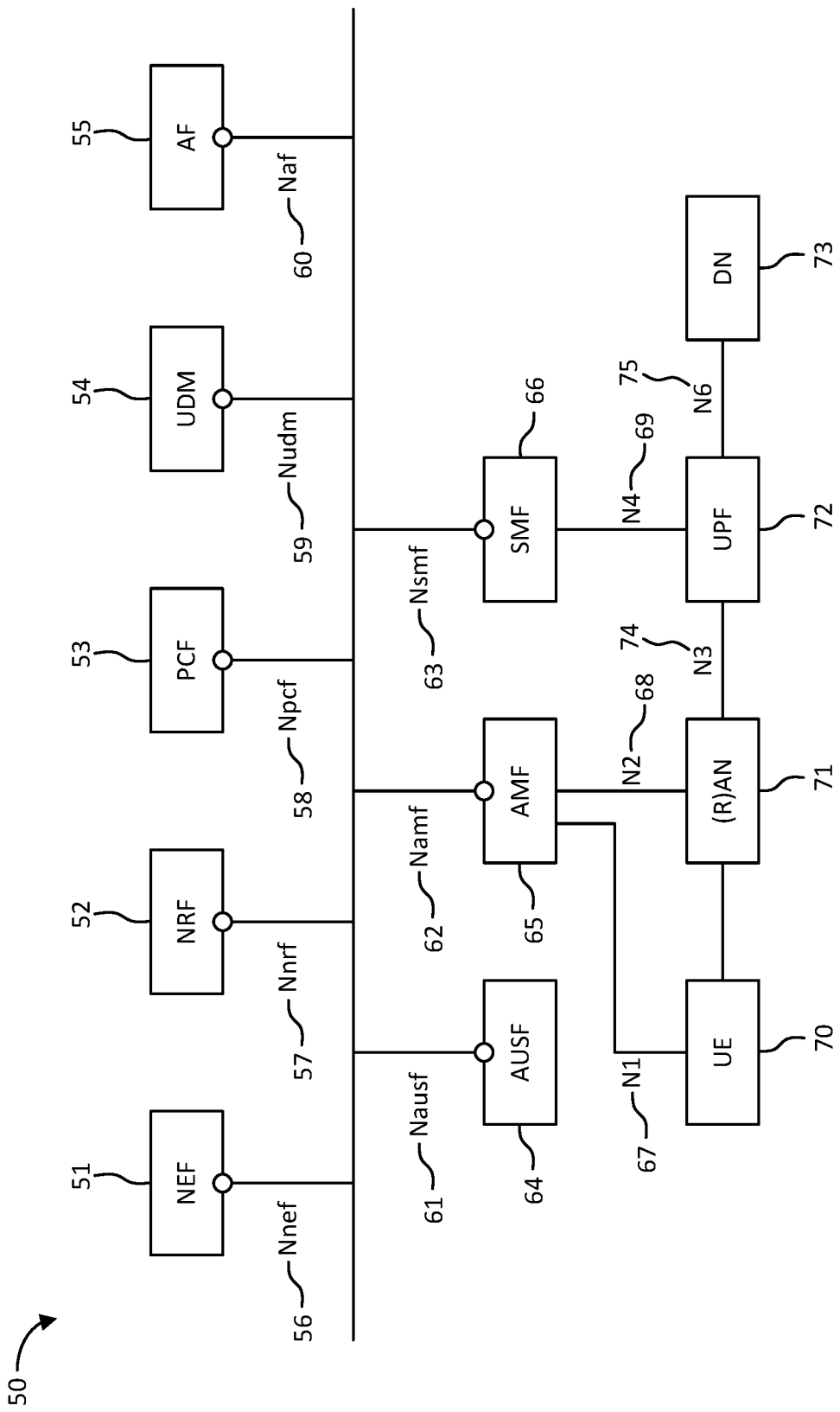
FIG. 1 depicts an example non-roaming reference architecture with service-based interfaces within the control plane.

Methods and apparatuses are described herein to allow a service capability server (SCS)/application server (AS) to configure the information sharing and mobility support among a set of local are data networks (LADNs)/data networks (DN). A simplified session establishment procedure for connecting to an LADN by re-using the session context information from a previous session is described herein. An application programming interface (API) and graphical user interface (GUI) to help Internet of Things (IoT) device applications to manage service disruptions is also described herein. Methods for a user equipment (UE) to pre-configure a background data transfer (BDT) for mobile originated (MO) traffic with a first LADN and then transferring the actual data transfer at a later to a second LADN are also described herein.

Table 1 below provides a list of acronyms relating to technologies that may be used in the architecture and in the examples described herein:

TABLE 1

| | |
|---|---|
| 5GC | 5G Core |
| AF | Application Function |
| AMF | Access and Mobility Management Function |
| AS | Application Server |
| CM | Connection Management |
| CN | Core Network |
| CP | Control Plane |
| DN | Data Network |
| DL | Downlink |
| DNN | Data Network Name |
| eMBB | Enhanced Mobile BroadBand |
| EPC | Evolved Packet Core |
| HSS | Home Subscriber Server |
| LADN | Local Area Data Network |
| LTE | Long Term Evolution |
| MME | Mobility Management Entity |
| MO | Mobile Originated |
| MT | Mobile Terminated |
| NAS | Non Access Stratum |
| NEF | Network Exposure Function |
| NF | Network Function |
| NIDD | Non-IP Data Delivery |
| NW | Network |
| OTT | Over-the-Top |
| PCEF | Policy and Charging Enforcement Function |
| PCF | Policy Control Function |
| PCRF | Policy and Charging Rules Function |
| PDN | Packet Data Network |
| PDU | Packet Data Unit |
| P-GW | PDN Gateway |
| QoS | Quality of Service |
| RAN | Radio Access Network |
| RAT | Radio Access Technology |
| RM | Registration Management |
| SCS | Service Capability Server |
| SCEF | Service Capability Exposure Function |
| S-GW | Serving Gateway |
| SMF | Session Management Function |
| SPR | Subscription Profile Repository |
| UE | User Equipment |
| UL | Uplink |
| UPF | User Plane Function |
| UDM | Unified Data Management |
| UDR | Unified Data Repository |

Table 2 below provides a list of definitions relating to technologies that may be used in the architecture and in the examples described herein:

TABLE 2

| | |
|---|---|
| Network Function (NF) | An NF is a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure. |
| PDU session | An association between the UE and a data network that provides a PDU Connectivity Service. Two types of PDU sessions are defined:<br>IP Type - data network is IP type<br>Non-IP type - data network is non-IP |
| Local Area Data Network (LADN) | A data network that is accessible by the UE only in specific locations, that provides connectivity to a specific DNN, and whose availability is provided to the UE. A LADN service area is a set of Tracking Areas. |
| Session Management in 3GPP CN | In 3GPP CN, session management is to manage the end-to-end PDN connection (IP or non-IP type) between UE and packet data network for the data transfer through the core network with policy (e.g., QoS) and charging control enforced. |
| The Application Function (AF) | Interacts with the 3GPP Core Network in order to provide services, for example to support the following:<br>Application influence on traffic routing<br>Accessing Network Exposure Function<br>Interacting with the Policy framework for policy control |

FIG. 1 depicts an example non-roaming reference architecture with service-based interfaces within the control plane 50. As shown in the example of FIG. 1, UE 70 has access, via Radio Access Network (RAN) 71, to Access and Mobility Management Function (AMF) 65 over N1 interface 67. Namf interface 62 is also shown. RAN 71 has access to Access and Mobility Management Function (AMF) 65 via N2 interface 68. RAN 71 has access to User Plane Function (UPF) 72 via N3 interface 74. UPF 72 has access to Session Management Function (SMF) 66 via N4 interface 69. Nsmf interface 63 is also shown. UPF 72 has access to data network (DN) 73 via N6 interface 75.

The example of FIG. 1 also shows other network functions (NF) within the control plane such as Network Exposure Function (NEF) 51 and Nnef interface 56, NF Repository Function (NRF) 52 and Nnrf interface 57, Policy Control Function (PCF) 53 and Npcf interface 58, Unified Data Management (UDM) 54 and Nudm interface 59, Application Function (AF) 55 and Naf interface 60, and (AUSF) 64 and Nausf interface 61.

Figure 2:
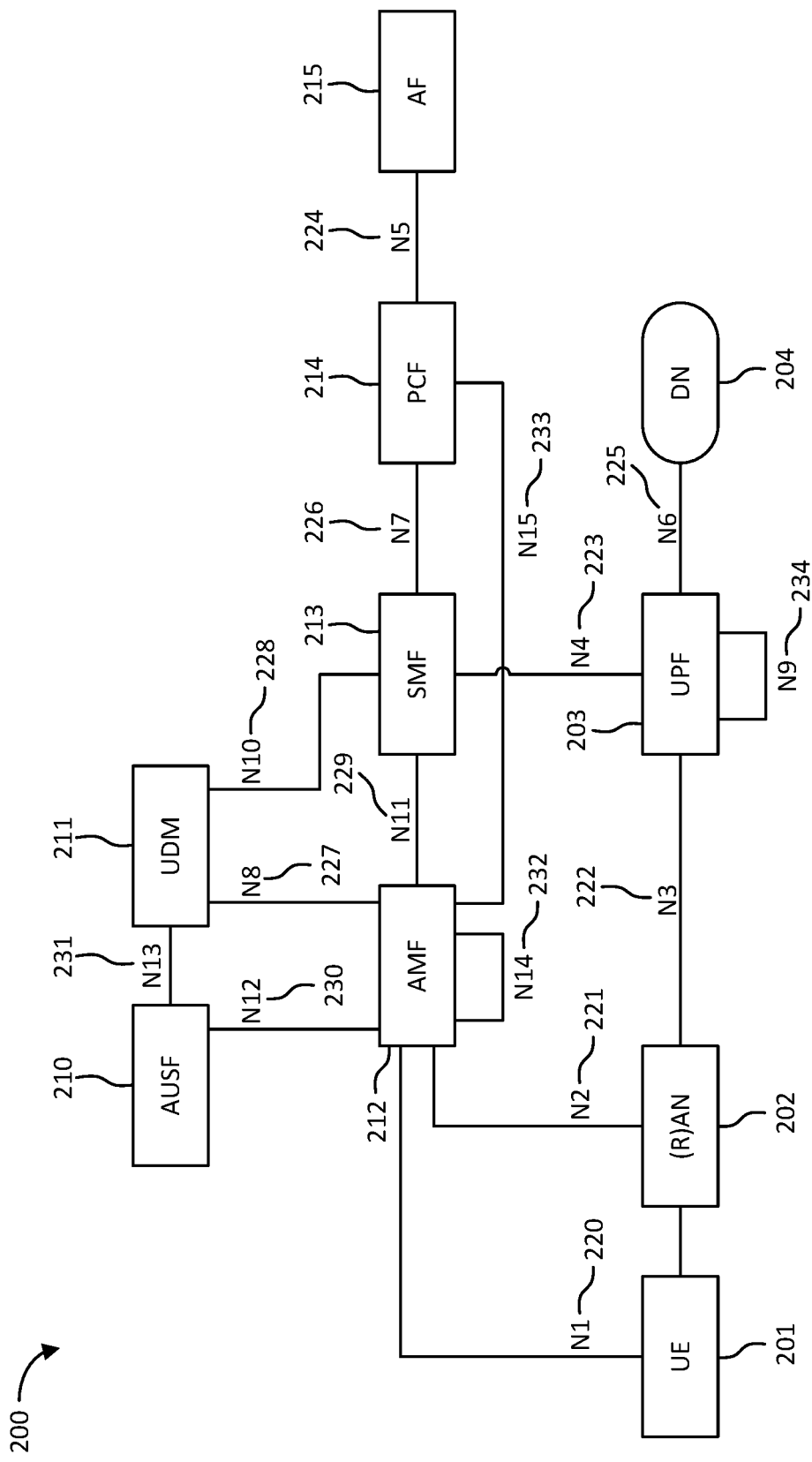
FIG. 2 depicts an example 5G System architecture in the non-roaming case.

FIG. 2 depicts an example 5G System architecture in the non-roaming case 200, using the reference point representation showing how various network functions interact with each other. The end-to-end communications, between the application in UE 201 and the application in the external network, may use services provided by the 3GPP system and may use service provided by a Services Capability Server (SCS), which may reside in DN 204. As shown in the example of FIG. 2, UE 201 has access, via RAN 202, to AMF 212 over N1 interface 220. N14 interface 232 is also shown. RAN 202 has access to AMF 212 via N2 interface 221. RAN 202 has access to UPF 203 via N3 interface 222. UPF 203 has access to SMF 213 via N4 interface 223. N9 interface 234 is also shown. UPF 203 has access to DN 204 via N6 interface 225. The example of FIG. 2 also shows other NFs within the control plane. PCF 214 may be in communication with SMF 213 via N7 interface 226. PCF 214 may be in communication with SMF 213 via N7 interface 226. PCF 214 may be in communication with AMF 212 via N15 interface 233. SMF 213 may be in communication with AMF 212 via N11 interface 229. SMF 213 may be in communication with UDM 211 via N10 interface 228. AMF 212 may be in communication with UDM 211 via N8 interface 227. AMF 212 may be in communication with AUSF 210 via N12 interface 230. UDM 211 may be in communication with AUSF 210 via N13 interface 231.

The application in the external network is typically hosted by an Application Server (AS) and may make use of an SCS for additional value added services. The 3GPP system provides transport, subscriber management and other communication services including various architectural enhancements motivated by, but not restricted to, (MTC) (e.g. control plane device triggering). The mobility management and session management functions may be separated. A N1 220 NAS connection may be used for both registration management and connection management (RM/CM) and for SM-related messages and procedures for UE 201. The N1 220 termination point may be located in AMF 212. AMF 212 may forward SM related NAS information to SMF 213. AMF 212 may handle the registration management and connection management part of NAS signaling exchanged with UE 201. SMF 213 may handle the session management part of NAS signaling exchanged with UE 201.

A Local Area Data Network (LADN) is defined as a DN that is accessible by a UE only in specific locations and that provides connectivity to a specific DN. The availability of the LADN may be provided to the UE. For example, access to a DN via a PDU Session for a LADN may be only available in a specific LADN service area. A LADN service area may include a set of tracking areas. 5GC shall provide support for the UEs to be made aware of the availability of a LADN based on the UE location.

AMF 211 may provide UE 201 with LADN information including information regarding availability of the LADN. AMF 211 may track and inform SMF 213 as to whether UE 201 is located in the LADN service area (i.e. the area of availability of the LADN). The LADN information may be configured in AMF 212 on a per DN basis. For example, for different UEs accessing the same LADN, the configured LADN service area may be the same regardless of other factors (e.g., UE's Registration Area).

LADN information provided to UE 201 by AMF 212 may comprise LADN data network name (DNN) and LADN service area information availability to UE 201. The LADN service area information provided to UE 201 during the registration procedure may include a set of tracking areas that belong to the current registration area of UE 201 (i.e. the intersection of the LADN service area and the current Registration Area). AMF 212 may not create a registration area based on the availability of LADNs.

Figure 3A:
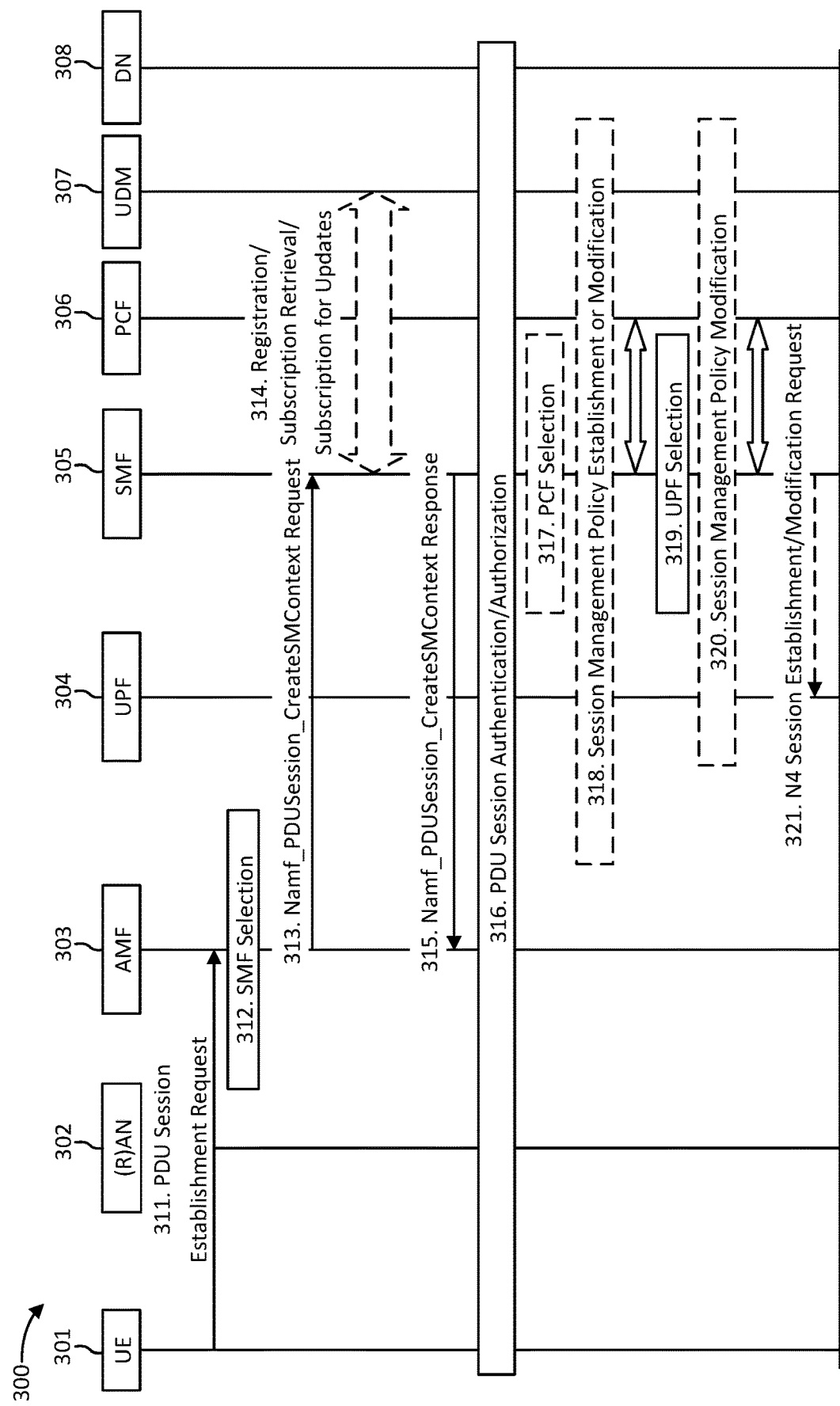
FIG. 3A is a diagram of an example procedure for establishing a PDU session.
Figure 3B:
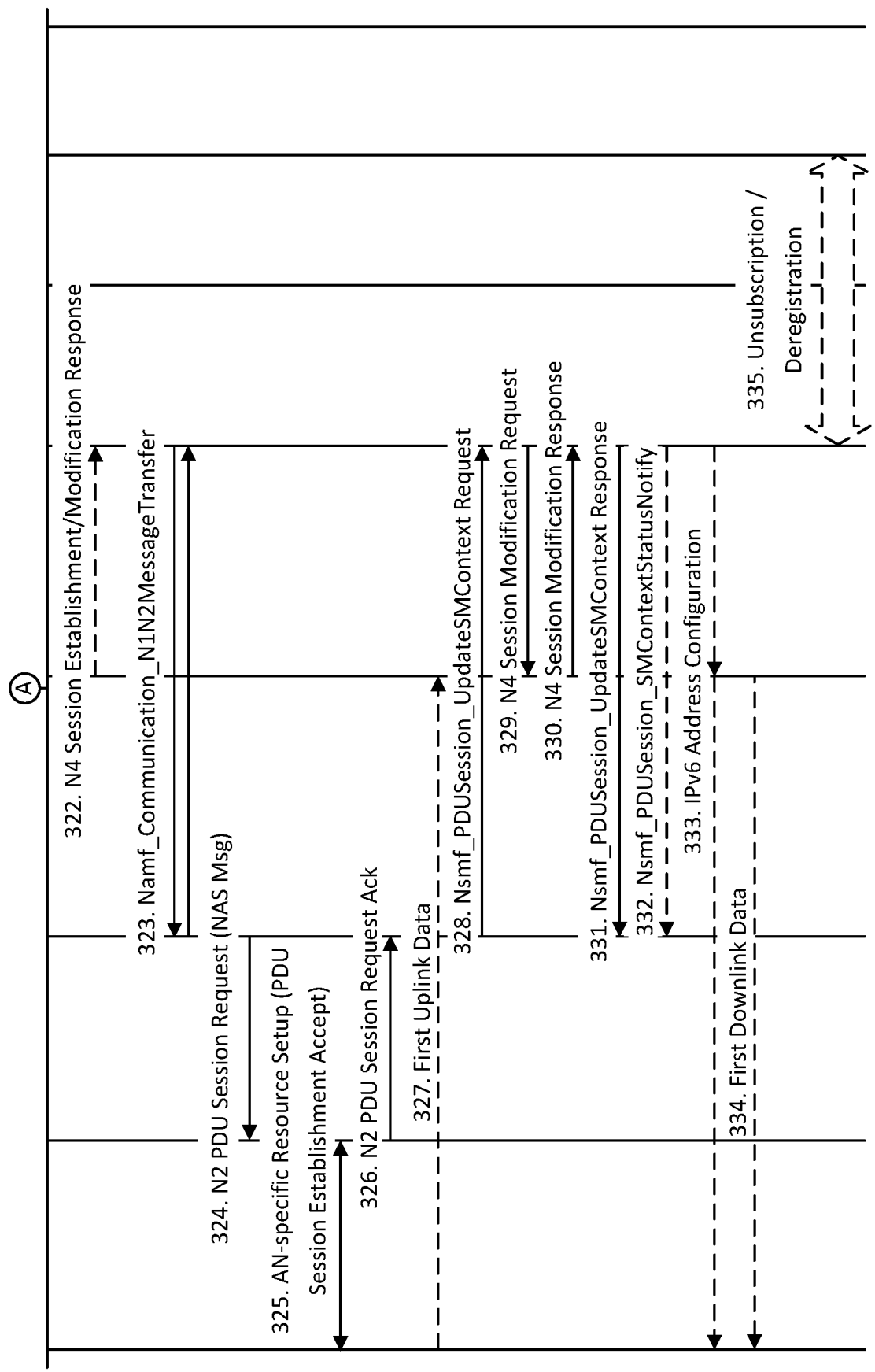
FIG. 3B is a continuation of the diagram of the example procedure for establishing the PDU session.

FIGS. 3A-3B is a diagram of an example procedure for establishing a PDU session 300, which may be initiated by a UE. While each step of the procedure 300 in FIGS. 3A-3B is shown and described separately, multiple steps may be executed in a different order than what is shown, in parallel with each other, or concurrently with each other. The 5G core (5GC) network supports a PDU connectivity service, which may be a service that provides an exchange of PDUs between a UE and a DN identified by a DNN. Each PDU session may support a single PDU session type, which may be requested by the UE at the establishment of the PDU Session. PDU session types may include but are not limited to IPv4, IPv6, Ethernet, and Unstructured. PDU Sessions may be established (upon UE request), modified (upon UE and 5GC request) and released (upon UE and 5GC request) using, for example NAS SM signaling exchanged over the N1 interface between the UE and the SMF. Upon request from an Application Server, the 5GC is able to trigger a specific application in the UE. When receiving that trigger message, the UE may pass it to the identified application in the UE.

Referring to the example of FIG. 3A, UE 301 may send, via RAN 302, a PDU establishment request (step 311) to AMF 303. AMF 303 may select an SMF (step 312) and then send a PDU session context creation request (step 313) to the selected SMF, SMF 305. SMF 305 may retrieve and/or update registration and subscriptions (step 314) and then may send a PDU session context creation response (step 315) to UDM 307. The PDU session may then be authenticated and authorized (step 316) between UE 301 and DN 308. SMF 305 may select a PCF 3 (step 317). SMF 305 and the selected PCF, PCF 306, may then establish and/or modify a session management policy (step 318). SMF 305 may then select a UPF (step 319). SMF 305 and PCF 306 may then modify the session management policy (step 320). SMF 305 may then send an N4 session establishment/modification request (step 321) to the selected UPF, UPF 304.

Referring to the example of FIG. 3B, UPF 304 may then send an N4 session establishment/modification response (step 322). SMF 305 and AMF 303 may transfer an N1N2 message via the Namf interface (step 323). AMF 303 may send an N2 PDU session request (step 324), which may be a NAS message, to RAN 302. UE 301 and RAN 302 may setup AN-specific resources (step 325) (i.e PDU session establishment acceptance). RAN 302 may then send an N2 PDU session request ACK (step 326). UE 301 may then transmit first uplink data (step 327). AMF 303 may then send a PDU session SM context update request (step 328) to SMF 305. SMF 305 may then send an N4 session modification request (step 329) to UPF 304. UPF 304 may send an N4 session modification response (step 330) to SMF 305. SMF 305 may then send an Nsmf PDU session SM context update response (step 331) to AMF 303 and Nsmf PDU session SM context status notification (step 332) to AMF 303. SMF 305 may configure the IPv6 address of UE 301. UE 301 may then receive first downlink data (step 334). PCF 306 may perform an unsubscription/deregistration (step 335).

Figure 4:
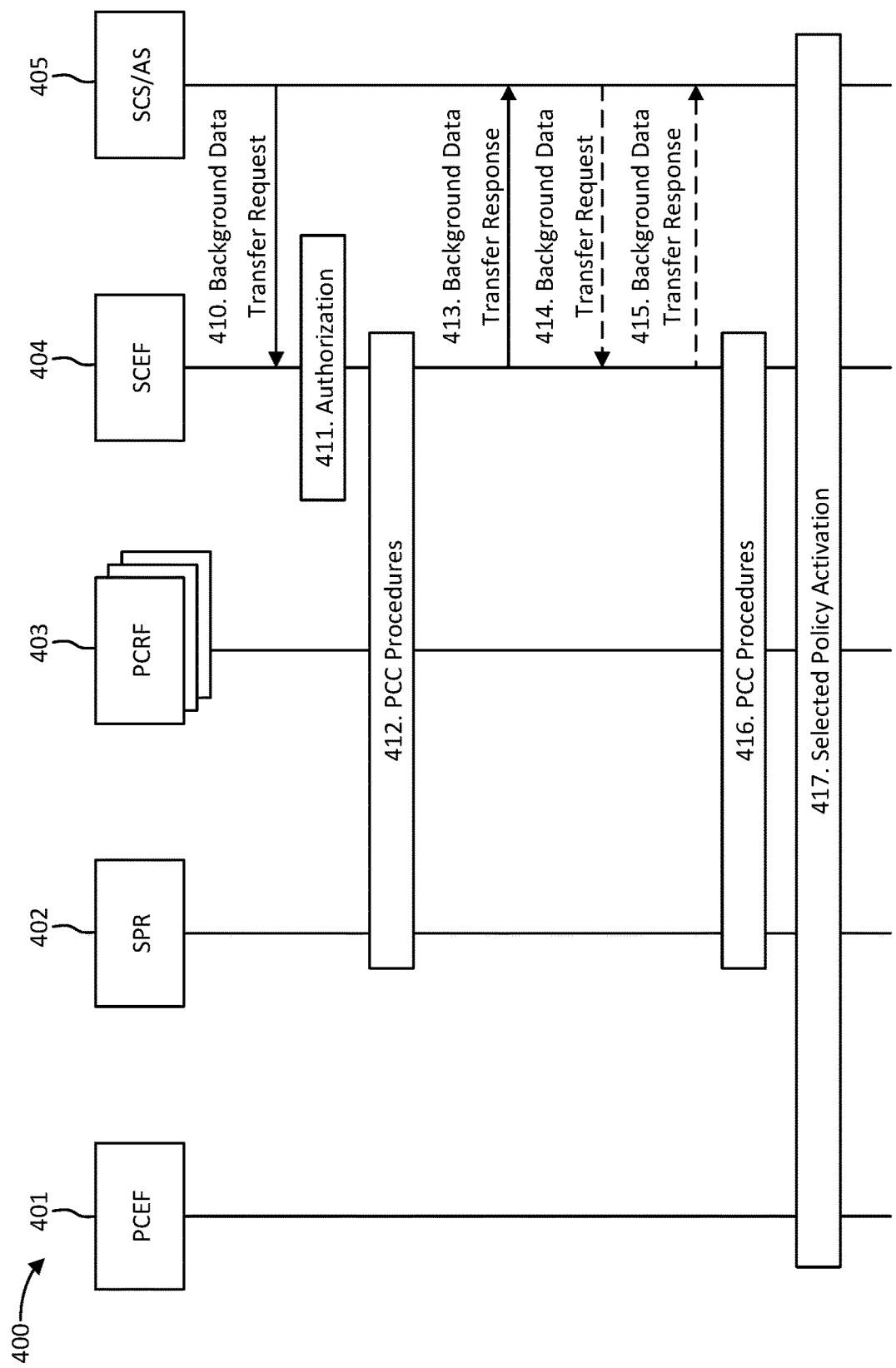
FIG. 4 is a diagram of an example procedure for background data transfer (BDT)

FIG. 4 is a diagram of an example procedure for background data transfer (BDT) 400. While each step of the procedure 400 in FIG. 4 is shown and described separately, multiple steps may be executed in a different order than what is shown, in parallel with each other, or concurrently with each other. BDT resource management procedures may allow a SCS/AS to pre-configure a data transfer to UEs during a specific time period with a certain data rate. The example of FIG. 4 shows the procedure for configuring a transfer policy for BDT in the EPC.

Referring to the example of FIG. 4, 3rd party SCS/AS 405 may send a background data transfer request message (step 410), which may include a SCS/AS Identifier, TTRI, Volume per UE, Number of UEs, Desired time window, to SCEF 404. SCS/AS 405 may provide a geographic area information. SCEF 404 may authorize (step 411) the SCS/AS request. SCEF 404 may select any of the available PCRFs 403 and may trigger policy control and charging (PCC) procedures (step 412). This may include the negotiation for future background data transfer procedures with PCRF 403 and SCEF 404 forwarding the parameters provided by SCS/AS 405. This may also include PCRF 403 responding to SCEF 404 with the possible transfer policies and a Reference ID. SCEF 404 may forward the Reference ID and the transfer policies to 3rd party SCS/AS405 by sending a background data transfer response message (step 413), which may include TTRI, Reference ID, and Possible transfer policies. SCS/AS 405 may store the Reference ID for the future interaction with the PCRF. If more than one transfer policy was received, 3rd party SCS/AS 405 may select one of them and send another BDT request message (step 414), which may include a SCS/AS Identifier, TTRI, Selected transfer policy, to inform SCEF 404 and PCRF 403 about the selected transfer policy. SCEF 404 may confirm the transfer policy selection with 3rd party SCS/AS 405 by sending a background data transfer response (step 415) message (TTRI). SCEF 404 may continue the negotiation for future background data transfer procedures (step 416) with PCRF 403, which may store the Reference ID and the new transfer policy in the SPR. SCS/AS 405 (acting as an AF) may contact the same or a different PCRF 403 for each individual UE (via the Rx interface), and SCS/AS 405 may provide the Reference ID. Alternatively or additionally, SCS/AS 405 may activate the selected transfer policy 417 with PCEF 401 via SCEF (step 417), for each UE in the group, by using a set the chargeable party at session set-up or a change the chargeable party during the session procedure.

Figure 5:
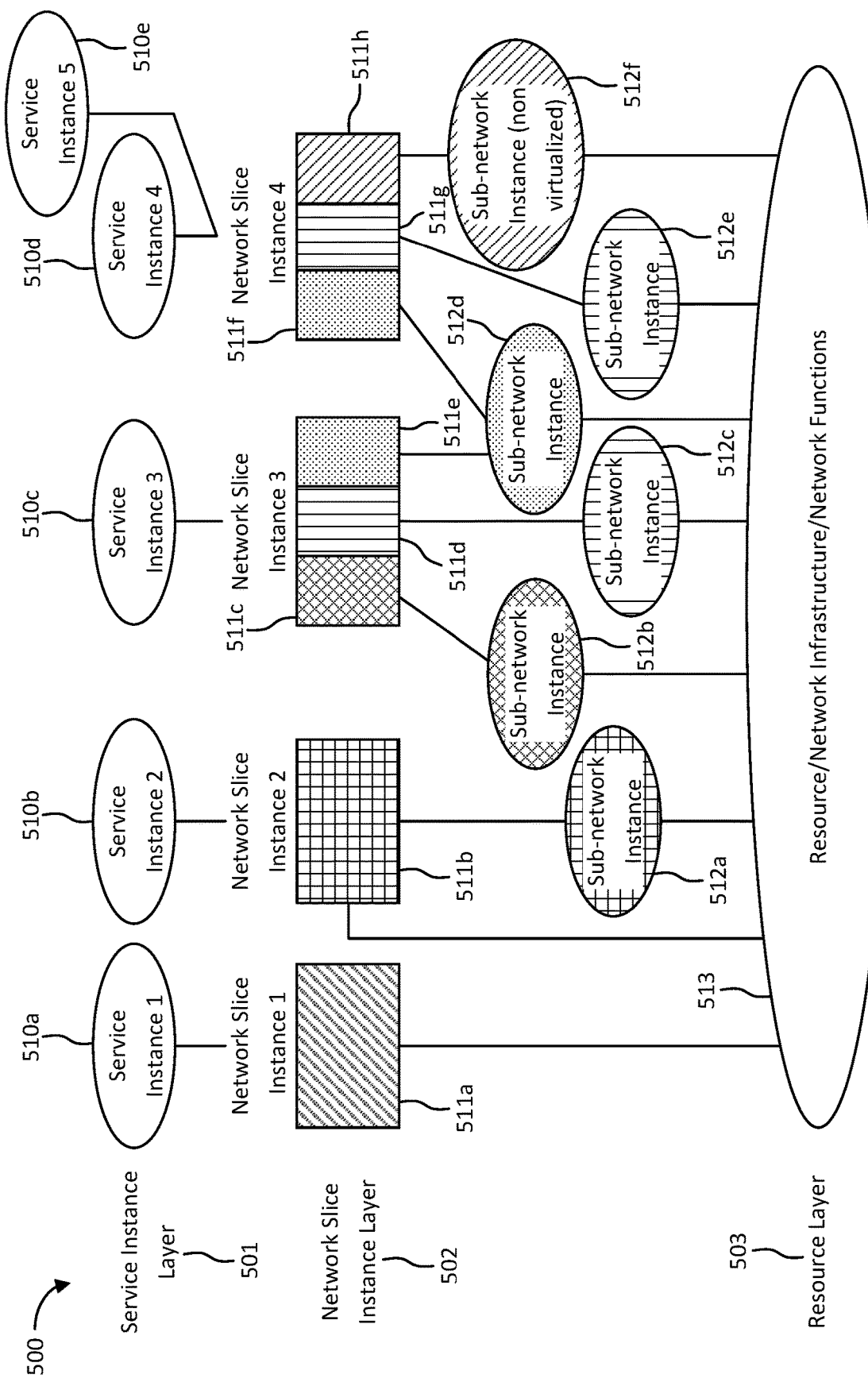
FIG. 5 is a diagram of a conceptual architecture of network slicing.

FIG. 5 is a diagram of a conceptual architecture 500 of network slicing. Network slicing is a mechanism that may be used by mobile network operators to support multiple "virtual" networks behind the air interface across the fixed part of the mobile operator's network, which may include both the backhaul and core network. Network slicing involves "slicing" the network into multiple virtual networks to support different RANs and/or different service types running across a single RAN. Network slicing may enable the operator to create networks that are customized to provide optimized solutions for different market scenarios that may demand diverse requirements, e.g. in the areas of functionality, performance, and isolation.

Referring to the example of FIG. 5, a network slice instance may comprise, in a resource layer 503, a set of network functions and the resources and network functions to run the network functions 513. The network slice instance later 501 may comprise a plurality of network slice instances, 511a, 511b, 511c, 511d, 511e, 511f, 511g, and 511h or sub-network slice instances 512a, 512b, 512c, 512d, 512e, and 512f. A sub-network slice instance comprises a set of network functions and resources to run those network functions, but it may not be in itself a complete logical network. A sub-network slice instance may be shared by multiple network slice instances as shown with sub-network slice instance 512d. Service instance layer 501 may comprise service instance 510a, 510b, 510c, 510d, and 510e.

Network slicing technology may be incorporated in technologies such as 3GPP 5G networks. Network slicing may enable the diverse and demanding requirements associated with some 5G network use cases (e.g., massive IoT, critical communications, and enhanced mobile broadband). The current pre-5G architecture utilizes a relatively monolithic network and transport framework to accommodate a variety of services such as mobile traffic from smart phones, over-the-top (OTT) content, feature phones, data cards, and embedded M2M devices. The specific set of performance, scalability and availability requirements associated with pre-5G architectures may not be flexible and scalable enough to efficiently support a wider range of business needs. Furthermore, introduction of new network services may be made more efficient. Nevertheless, several use cases are anticipated to be active concurrently in the same operator network, thus benefiting from the high degree of flexibility and scalability associated with a 5G network.

Figure 6:
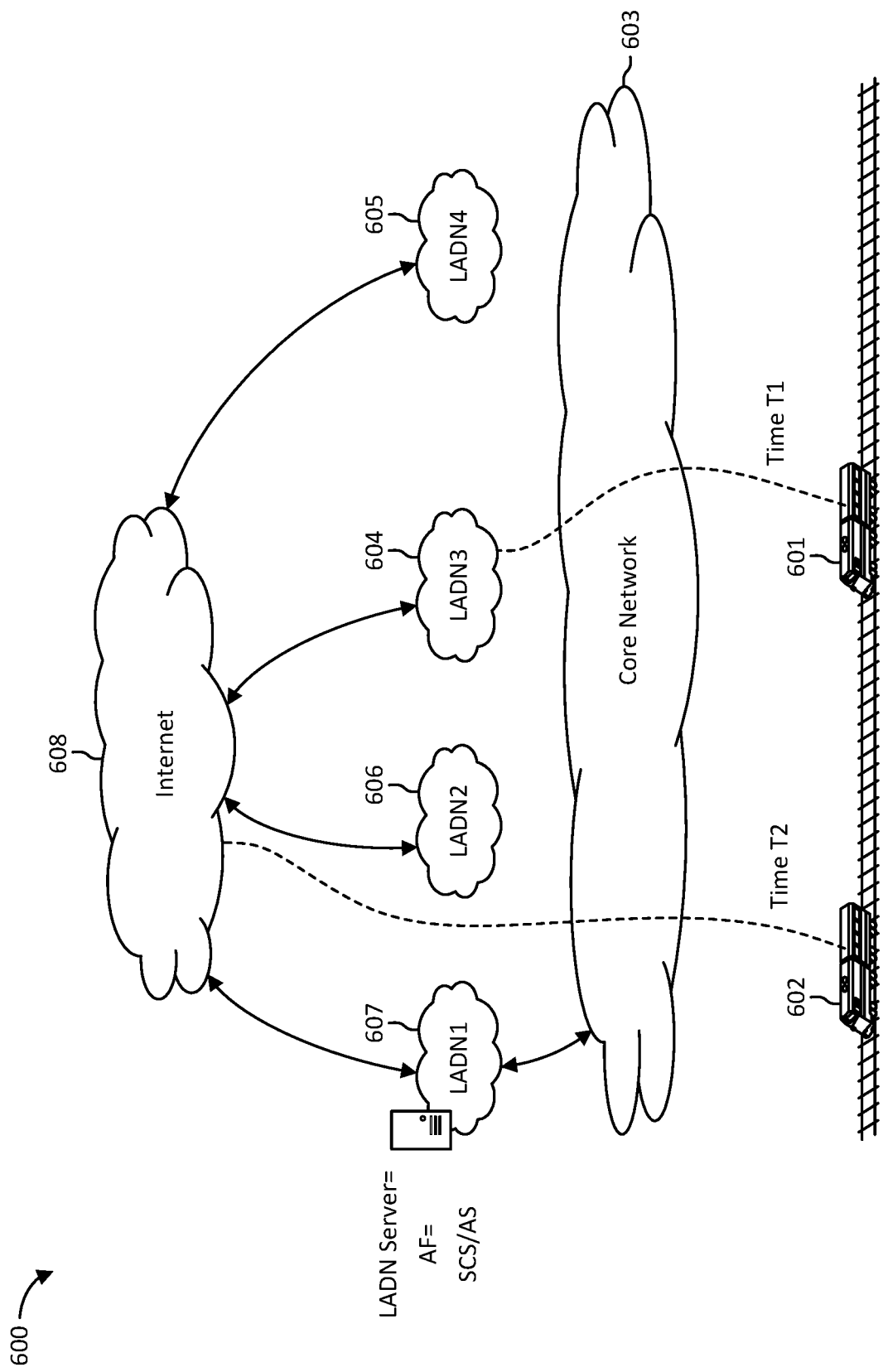
FIG. 6 is a diagram of an example LADN use case for a 5G network.

FIG. 6 is a diagram of an example LADN use case for a 5G network 600. In this example, commuter train may have a video surveillance system and electronic billboards. The train may have communications circuitry enabling connecting to core network 603, the Internet 608, and a plurality of LADNs 605, 604, 606, and 607. An LADN server may comprise an SCS/AS hosting a plurality of AFs. When the train arrives at a station, it may connect to an LADN, such as LADN 604, upload video recordings from the surveillance system and download some local advertisements for the billboards. The devices (e.g., UEs) used by the passengers in the train may also connect to the LADN to download movies and/or upload certain content in the devices for backup. For the video upload and local advertisement download, the train may connect to an LADN to first determine whether the LADN supports the video upload, or if LADN has any local advertisements for download. Since the train arrives at and leaves each station with a relatively fixed schedule, the connection to the LADN and the duration of the connection may be predictable. Moreover, the connection may be periodic. For example, the train may connect to the LADN 604 once a day around the same time, T1 601, and the Internet 608 around the same time T2 602, assuming it passes the station with the same schedule.

Different LADNs along the railway may be assigned with different capabilities by the network operator. For example, one LADN may be able to provide a high uplink data rate, while it does not have movie/video content for download.

Another LADN may have the SCS/AS storing the desired video content but not supporting uplink data transfer. Therefore, the device may be able to know what services the LADN supports and be able to schedule or plan for accessing these services before connecting to the LADN.

As discussed above, based on the train schedule, it may be predictable when the train will start the connection to a LADN and for how long. In other words, the connection to LADN could be pre-determined according to the train schedule. The connection may be recurrent (periodic in the train use case for a fixed period of time). However, the mechanisms defined in 5GC for establishing a connection (i.e., PDU session) to an LADN involve many steps, such as the UE requesting registration, requesting to create/activate the PDU session, location information verification by AMF to make sure that UE is within the service area of the LADN, and anchor point selection by the session management function (SMF). Since such a connection to an LADN takes place with the similar pattern in terms of time instants and time durations, it is desirable to have streamlined mechanisms of session establishment/activation with regard to an LADN, so that a UE or in the example above, the train, may complete data transfers quickly and efficiently.

In addition, without knowing the capability of LADNs, it may not be possible to schedule data transfers at one LADN (e.g., train station 1), and perform the scheduled activity at the pre-configured LADN (e.g., train station 2), in a way in which it may save time and make it more efficient. For example, the train may want to upload the video records, however, the LADN it is connecting to may not support high uplink data rate. The current LADN may know that the LADN serving the next station supports the high speed uplink data transfer. Therefore, the current LADN may schedule the uplink data transfer at the next LADN for the train and notify the train to do so when pulling into the next station. Existing mechanisms in 5GC do not support such operations. There is a need to define mechanisms allowing the device to schedule and perform the data transfer at different LADNs, such as for mobile originated (MO) traffic. There is a need for streamlined mechanisms of session establishment/activation with regard to an LADN, which may be enabled by additional information sharing between network functions (NFs) that serve different LADNs.

For constrained IoT devices, it may be desired to have group based data transfer for the above operations. In other words, it may be more efficient to schedule and perform the data transfer at different LADNs for a group of IoT devices (e.g., sensors).

An LADN in 5G is a type of DN that is accessible by a UE only in specific locations, that provides connectivity to a specific DN, and whose availability is provided to the UE. LADNs enable operator and 3rd party services to be hosted close to a UE's access point of attachment, so as to achieve an efficient service delivery through reduced end-to-end latency and load on the transport network. Method and apparatuses are described herein for configuring the information sharing and mobility support among a set of LADNs; for moving a PDU session from an LADN to another LADN without repeating the procedure for establishing a PDU session to connect a LADN; for background data transfer (BDT) configuration for MO Traffic with LADN including a UE initiated procedure, a DN/LADN initiated procedure, and a group based BDT; and for MO BDT in LTE EPC.

FIGS. 7 to 16 (described hereinafter) illustrate various embodiments associated with managing connections to LADNs. In these figures, various steps or operations are shown being performed by one or more nodes, apparatuses, devices, servers, functions, or networks. For example, the apparatuses may operate singly or in combination with each other to effect the methods described herein. As used herein, the terms apparatus, network apparatus, node, server, device, entity, network function, and network node may be used interchangeably. It is understood that the nodes, devices, servers, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in the figures described herein. That is, the methods described herein may be implemented in the form of software (e.g., computer-executable instructions) stored in a memory of a network node, such as for example a node or a computer system, and the computer executable instructions, when executed by a processor of the node, perform the steps described herein. It is also understood that any transmitting and receiving steps illustrated in these figures may be performed by communication circuitry of the node under control of the processor of the node and the computer-executable instructions (e.g., software) that it executes. It is further understood that the nodes, devices, and functions described herein may be implemented as virtualized network functions.

In the embodiments described herein, the term AF may be used to represent an SCS/AS in the LADN. LADN servers may communicate with the core network to configure policies and exchange information. The AF may not reside in the LADN and instead may be a standalone/independent application management function operated by a network operator to deal with a different service provider.

Figure 7:
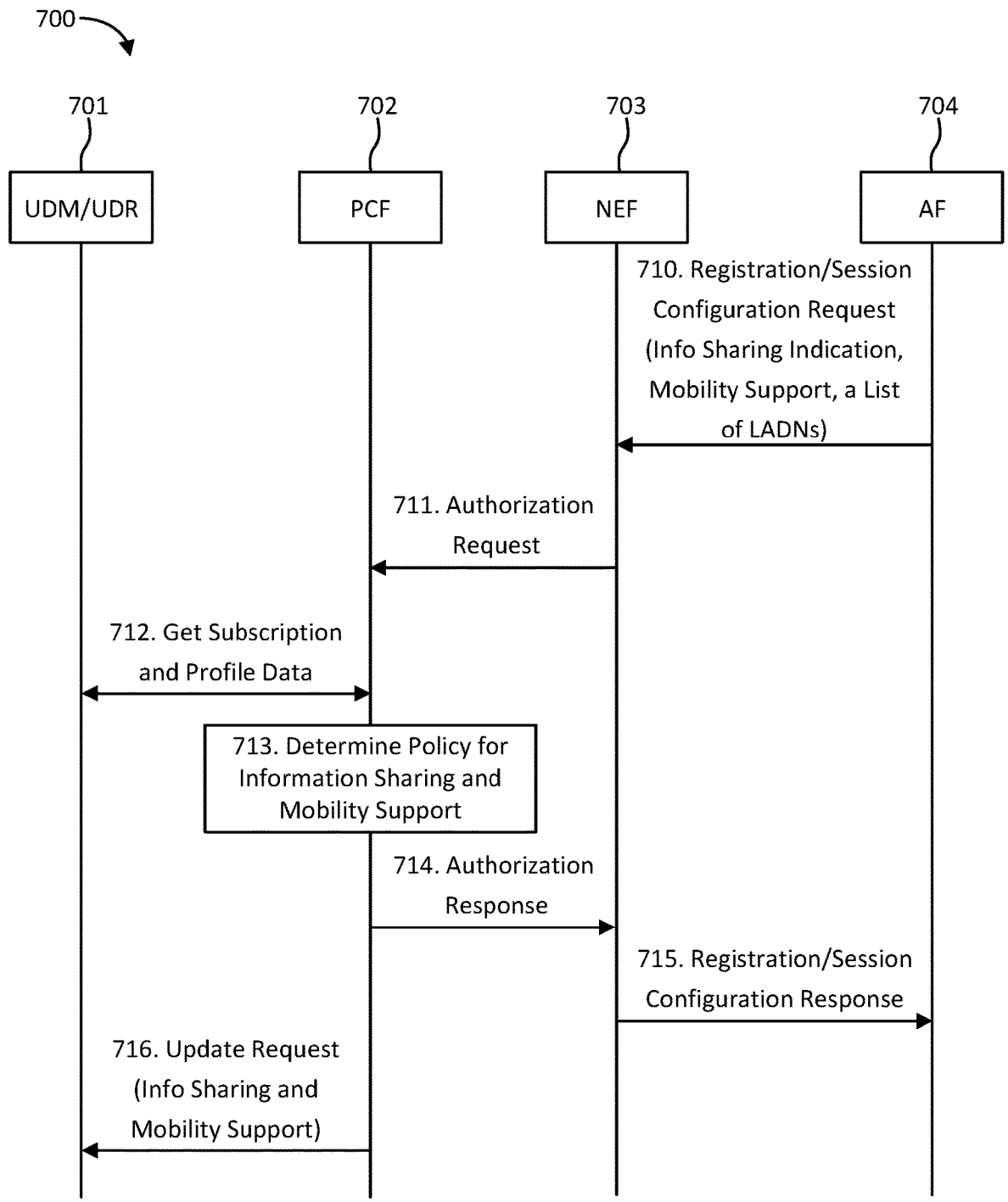
FIG. 7 is a diagram of an example procedure for configuring information sharing and mobility support among LADNs.

FIG. 7 is a diagram of an example procedure for configuring information sharing and mobility support among LADNs 700, which may be used in one embodiment. While each step of the procedure 700 in FIG. 7 is shown and described separately, multiple steps may be executed in a different order than what is shown, in parallel with each other, or concurrently with each other. Context information may be shared among a set of LADNs. A set of LADNs may belong to the same network operator. Various types of information may be shared including but limited to:

A policy, such as a BDT policy that may be configured by a LADN and that may be re-used by other LADNs that support a same application or belong to a same network operator and may include a charging policy and/or policy about mobility support in the context of LADN; and UE registration/connection information and session context information when a UE connects to a LADN. The UE specific context may be shared among a set of LADNs.

Such information sharing results in various benefits including the benefit that the registration and session management may be simplified for a UE when it connects and/or establishes a PDU session with a LADN. Another benefit is that mobility is supported, which in the context of an LADN includes:

For one LADN, the registration and session context information may be maintained when a UE is moving out of the service area, and the context information may be retrieved when the UE moves back. For example, as illustrated in the use case described above, this may be made more efficient when the UE's connection to an LADN(s) is periodic.

Across multiple LADNs, the registration and session context may be maintained and transferred/shared when a UE is moving. This may be useful in an edge caching use case where the UE is accessing content from an edge cache in one LADN and moves to another LADN where the same content is cached or moves to an LADN or DN where the content is not cached and needs to access the original version of the content.

For the train use case described above, if the LADNs along the railway form a LADN group, then they may take advantage of the information sharing. The train may connect with the LADN if it is in proximity to the LADN, and the LADN server (i.e., SCS/AS) may communicate with the CN to configure policies associated with the information sharing.

Referring to the example of FIG. 7, AF 704 may send a request message indicating a request for a registration/session configuration (step 710) to NEF 703 in order to configure the information sharing and mobility support. This message may request configuration of a policy in the network that will apply to more than one LADN and may relate to how a UE's connection and/or session may persist across LADNs. The request message may be encapsulated in other types of request messages. Information including but not limited to the following may be included: AF ID; UE ID(s) (SUPI or GPSI) of the devices that the request should apply to; a list of the LADN/DN identifiers to indicate what LADN/DNs to which the policy applies; an indication that the AF would like to enable the information sharing features; an indication of what types of LADNs that the policy may relate to; types of information and/or polices that may be shared across LADNs; an indication that the AF would like the core network to support mobility when a UE is connecting to a particular LADN; a UE type or application type, which may indicate the type of UE (e.g., mobile non-IoT device) and application (e.g., mIoT, eMBB, etc.) that may obtain mobility support when connecting to a LADN; and a level of mobility support.

The indication that the AF would like to enable the information sharing features may allow polices or a user context to be shared across AMFs, SMFs, or UPFs that serve different LADNs. Moreover, the policies and the user context may also be shared across PCFs when they configure the policy for different LADNs.

The AF may provide an indication of what types of LADNs the policy relates to instead of a list of LADNs' identifiers or DNs' identifiers. For example, this indication may indicate LADNs that support certain services, LADNs that relate to certain NSSAIs or SSTs, or LADNs that belong to certain network operators.

Types of information and/or polices that may be shared across LADNs may include background data transfer policies, a charging policy, UE registration and session context information, etc.

The indication, that the AF would like the core network to support mobility when a UE is connecting to the particular LADN, may include for example, when the AF chooses not to enable the mobility support, when a UE connecting to the LADN moves out of the service area, the PDU session may be released by the SMF upon the SMF being notified by the AMF. When the AF enables mobility support, the SMF may not release any existing PDU session that this LADN DNN unless the UE receives explicit PDU Session release request from network The level of mobility support may indicate to what extent mobility is supported. For example, this may indicate if mobility is supported for one LADN or across multiple LADNs. For one LADN, this may indicate if the registration status is maintained by a LADN when a UE moves out of its service area, and if PDU session is released, and if the registration and session context are maintained. For multiple LADNs, this may indicate whether the registration and session information and status may be transferred from one LADN to another LADN when the UE is moving around, which may include for example, from one SMF and/or UPF to another SMF and/or UPF.

The AF may also indicate the capability and service provisioning that an LADN may provide, so that the service advertisement may enable efficient service discovery for UE, core network entity, and other service provider. An example service may include an LADN that may send notifications to an application on UE when the LADN detects that the UE's location is within the vicinity of a service area of the LADN, or that a specific service provided by the LADN is available in proximity.

NEF 703 may identify and select a PCF (e.g, PCF 702) to handle the request from AF 704 or handle requests that are related to each UE that AF 704 listed in the request, and then send an authorization request message (step 711) to PCF 702 with information received by NEF 703. In addition, NEF 703 may generate a new ID as the reference for this request process.

PCF 702 may contact UDM/UDR 701 to obtain subscription and policy profile data (step 712). PCF 702 may include the ID of AF 704 and the identities of the LADN(s) to which the policy may relate. UDM/UDR 701 may use the information to identify whether there is any existing related policy configured for the LADN/DN. If UDM/UDR 701 finds any policy (e.g., information sharing, background data transfer policy, and charging policy) related to the LADN/DN or the target UE(s), it may return such policy profiles to PCF 702, which may re-use and/or modify these policies.

PCF 702 may determine a new policy (step 713) based on the request from AF 704 and profile data from UDM/UDR 701. For example, the following policy may be determined: a level of mobility support regarding the connection to the LADN, such as registration and PDU session status, mobility for one LADN, or across multiple LADNs; a type of information that is shared; and the scope of information sharing, such as within the same network slice, within one PLMN The type of information that is shared, may include, for example, a policy, such as a BDT policy configured by a LADN or a charging policy that is shared among a set of LADNs that belong to the same network operator. Another example is the registration/connection information and session context information for a group of UEs.

PCF 702 may then send an authorization response (step 714) to NEF 703, and a registration/session configuration response (step 715) may be sent to the AF (e.g., AF 704) corresponding to the request about the decision (step 710). NEF 703 and AF 704 may be provided with a policy identifier, a list of what LADN/DN(s) the policy applies to, and a policy identifier.

PCF 702 may request UDM/UDR (701) to update the subscription and policy profile to reflect the new policy about information sharing and mobility support (step 716). The stored policy may include all of the information that is listed in steps 714 and 715. For example, PCF 702 may request an indication that an existing BDT policy for MT traffic set by a LADN be shared/re-used by a set of LADNs that belong to the same network operator.

Note that steps 711, 712, 713, 714, and 716 may be executed once for each UE that was specified in the AF's step 710 request. Two LADNs or DNs may share information by directly communicating with each other from the application layer perspective. In addition, for the BDT configuration and schedule, one LADN may communicate with another LADN to inform the another LADN about the schedule and policy of the BDT using an application and service layer message exchange.

The LADN information as described herein may comprise LADN Service Area Information and a LADN DNN. The LADN information may be configured in the AMF on a per DN basis, i.e. for different UEs accessing the same LADN. The configured LADN service area may be the same regardless of other factors (e.g. UE's Registration Area). The lack of flexibility may prevent the application provider from dynamically configuring the LADN to serve more UEs or providing application service more efficiently to UE.

One solution may include defining flexible service areas of an LADN at different times for providing different applications/services. For example, an AMF may indicate to a UE that the service area of an LADN is a set of tracking areas at day time for application 1, while changes to the whole registration area may be assigned to the UE at night. For application 2, the service area of the same LADN may be different. Therefore, the following parameters may be associated with the service area of LADN to make it more flexible: service area; application service ID to identify an application or a list of applications for which the specified service area is valid; time schedule, which may indicate a time period during which the specified service area is valid; granularity of service area, which may indicate the level of service area comprising, for example, tracking area, registration area, cells, or geographic area; and QoS parameters, which may indicate some QoS parameters that may be supported within the service area, for example, maximum data rates and latency.

In addition, a NWDAF may help the AMF and the AF/AS to determine the service area by considering the factors including but not limited to: traffic load of the LADN, e.g., amount of data transferred, number of UEs, and total network resource allocated for data transfer to/from the LADN. If more data is transferred, and the LADN is getting congested, the NWDAF may contact the SMF/AMF and recommend shrinking the service area so that the traffic load may decrease to alleviate the congestion. UEs' mobility statistics may be collected by the NWDAF for a UE or a group of UEs that stay in the service area of a LADN and register to access the LADN and make recommendation to AF/AS and/or AMF to set up the service area.

When a UE requests to access a LADN during registration or session management related procedures, the AMF may forward the service area information and those associated attributes of a LADN to the UE. In addition, a network may dynamically update the service area or any associated attributes of a LADN, e.g., that the LADN is getting congested, so that the AMF or the SMF may notify the UE about the change of the service area of LADN, or any of associated attributes. A UE configuration update procedure may be used for this notification. The AF or AS may also trigger network functions to initiate such action if the AF/AS wants to change any parameters associated with the service area.

Figure 8:
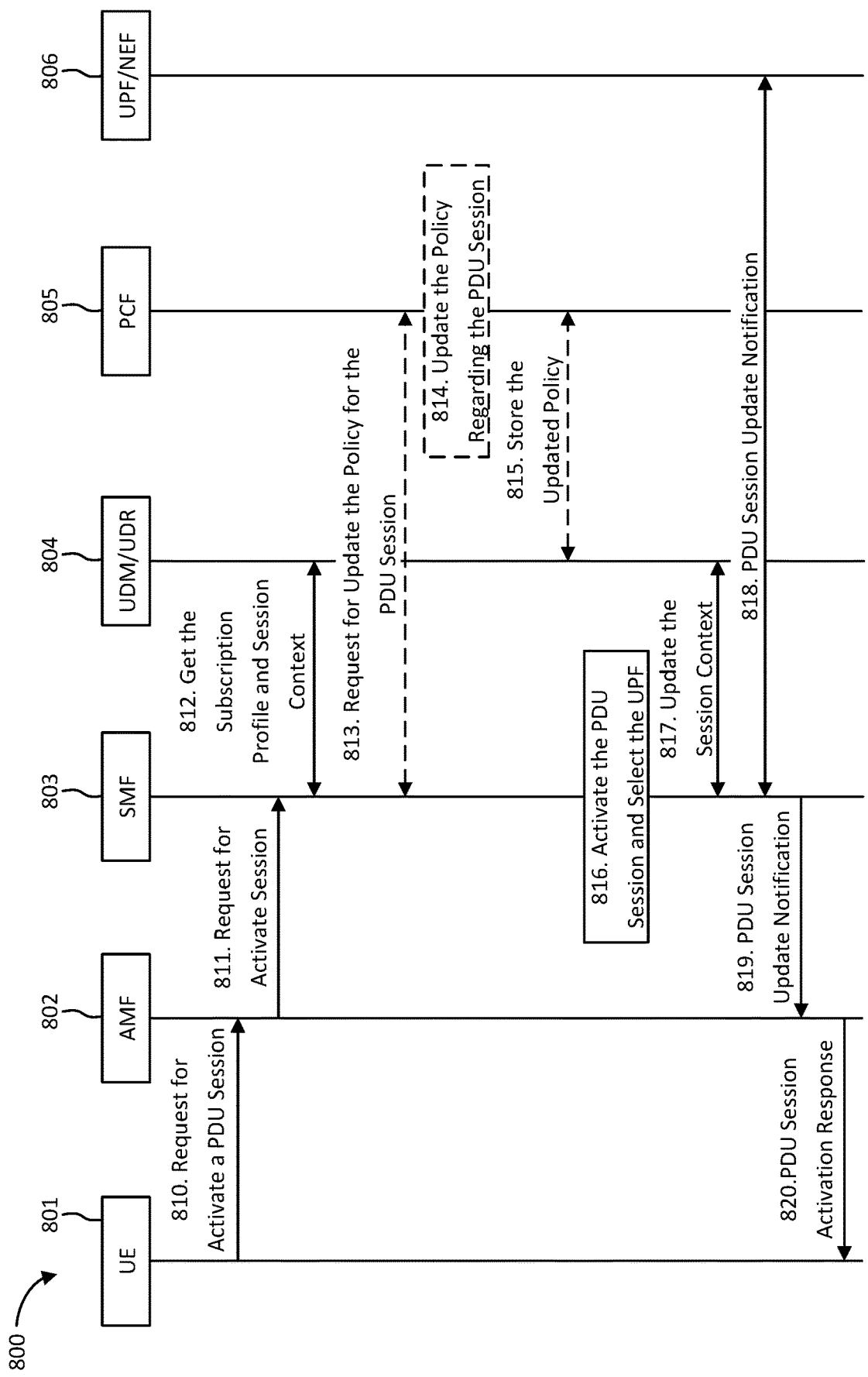
FIG. 8 is a diagram of an example procedure for moving a PDU Session from a first LADN to a second LADN.

FIG. 8 is a diagram of an example procedure 800 for moving a PDU Session from a first LADN to a second LADN, which may be used in combination with any of the embodiments described herein. While each step of the procedure 800 in FIG. 8 is shown and described separately, multiple steps may be executed in a different order than what is shown, in parallel with each other, or concurrently with each other. Referring to the example, of FIG. 8, UE 801 may send AMF 802 a request to move a session from a first LADN to a second LADN (step 810). This request may include be a PDU session establishment or PDU session modification message. In the request, the UE may include the following information: session ID of a previously activated PDU session; identifier of the LADN/DN where the session should be activated; identifier of the LADN/DN where the session last existed; an indication that the request is for the reactivation of a session that previously existed in the LADN/DN or a different LADN/DN; and QoS Requirements, such as aggregated maximum data rate, maximum latency, etc. AMF 802 may select an SMF to handle the request (e.g. SMF 803) and forward the request to SMF 803 (step 811). Due to mobility, a different SMF may be selected compared to the one that originally established the PDU session.

SMF 803 may obtain subscription information and session context of UE 801 from UDM/UDR 804 (step 812). The session context may include information including but not limited to QoS parameters, the periodic indication set up when the session was originally created, time interval between two active periods, the average duration of each active period, and the status of the PDU session (e.g., active, de-active, released). Alternatively or additionally, SMF 803 may obtain subscription information and session context from the UPF/NEF that was last used to anchor the session. SMF 803 may then decide whether to use the same anchor point or not. For an LADN scenario, SMF 803 may first consider the service area of the LADN in the determination. If SMF 803 is different than the SMF that is currently, or previously, serving the session, UDR/UDM 804 may send a notification to the previous SMF indicating that the previous SMF is no longer serving the session. If the SMF is different than the SMF that is currently, or previously, serving the session, the SMF may contact the previous SMF to retrieve the session context information and indicate to the previous SMF that it is now serving the session. The session context information may include the identity of the UPF that is currently, or previously, serving the session.

SMF 803 may communicate with PCF 805 regarding the policy configuration for the PDU session (step 813) in case that some session context information is to be changed, e.g., data rate, duration of each active period, connect to a different LADN, etc.

PCF 805 may retrieve the corresponding policy by correlating the session ID, UE ID, and destination LADN ID, and then PCF 805 may update the policy (step 814) (e.g., charging policy, data rate) regarding the data transfer over the PDU session to the new LADN. PCF 805 may obtain a more detailed policy profile by contacting the UDM/UDR 804, which may store the updated policy with the policy ID (step 815). SMF 803 may activate the PDU session and selects the anchor point to serve the session (step 816). The anchor point may be a UPF or a NEF (e.g., UPF/NEF 806) depending on the path of PDU session. A different or the same UPF/NEF may be selected compared to the UPF/NEF selected when the session was activated previously.

SMF 803 may update the session context information in UDM/UDR 804 (step 817). SMF 803 may notify the anchor point (e.g., UPF/NEF 806) about the activation of the PDU session (step 818), where information including but not limited to session ID, policy information (e.g., data rate, maximum latency), and LADN ID may be provided. SMF 803 may reply to AMF 802 with a PDU session update notification by including the session context information (step 819). AMF 802 may send a response to UE 801 to indicate that the PDU session is activated, re-activated, or moved (step 820). If UPF/NEF 806 is relocated, a new UPF/NEF 806 address may be given. Compared with the procedure of FIGS. 3A-3B, the procedure 800 of re-establishing a PDU session by sharing the information reduces the control signaling in the case that the UE moves from one LADN to another.

Figure 9:
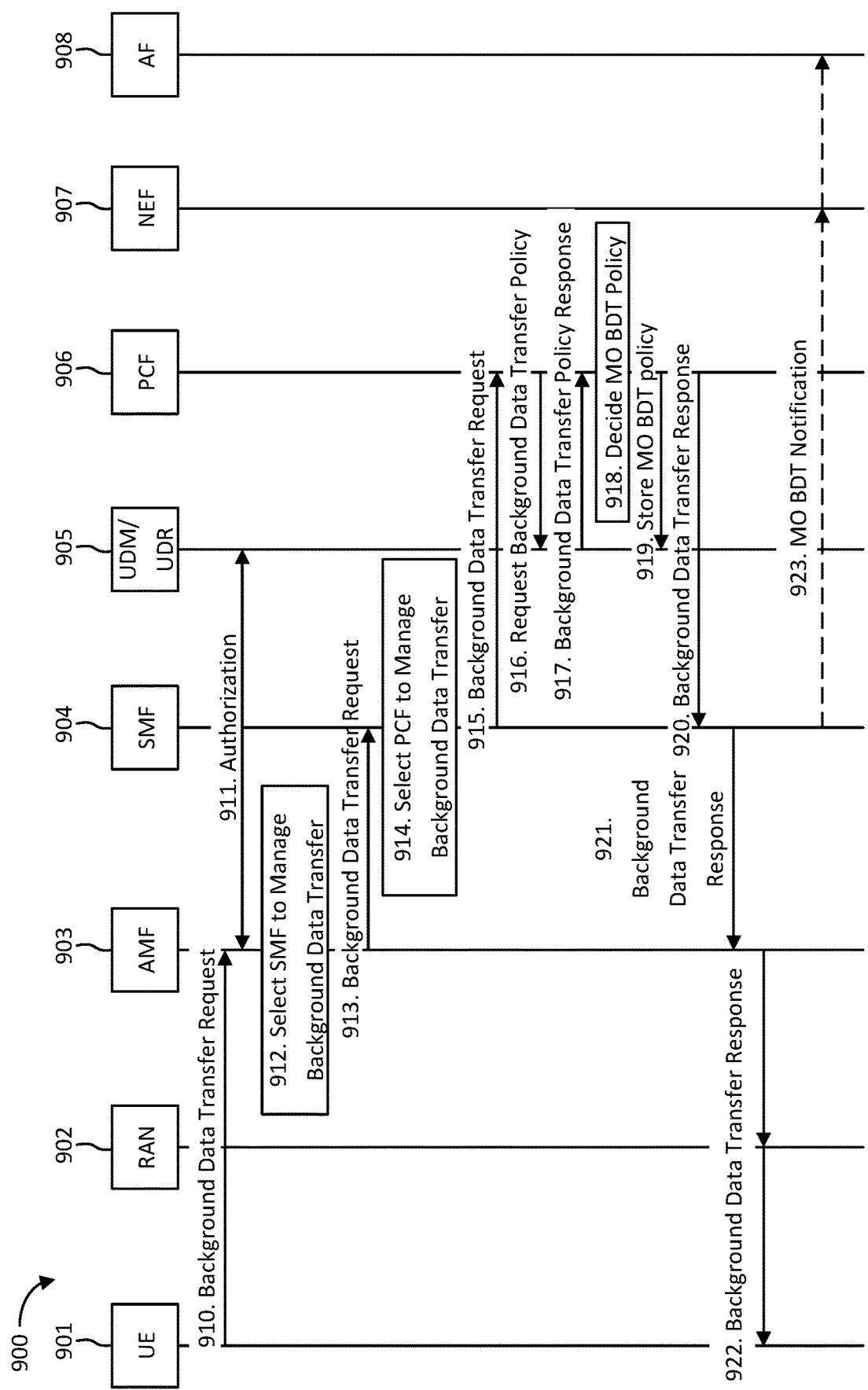
FIG. 9 is a diagram of an example procedure initiated by a UE for configuring a BDT for MO traffic.

FIG. 9 is a diagram of an example procedure 900 initiated by a UE for configuring a BDT for MO traffic, which may be used in combination with any of the embodiments described herein. While each step of the procedure 900 in FIG. 9 is shown and described separately, multiple steps may be executed in a different order than what is shown, in parallel with each other, or concurrently with each other. In the train use case described above, a network operator may place one LADN at each station along a railway. For example, the train may schedule a data transfer with an LADN at one station and may transfer MO data to the LADN at the next station. In this example, the next LADN may support a higher uplink data rate, or the train may not have complete data to upload until arriving at the next station, or the train may upload the security video that was captured since the last stop. Alternatively, the train may also schedule the data transfers with a centralized data network, which may instruct the train which LADN to which the data transfer should be directed. A UE (e.g., video camera installed on the train or terminal device used by the passengers on the train) may initiate configuring a BDT procedure for MO traffic. For example, the UE may initiate the configuration procedure by triggering a target LADN or DN in order to initiate a configuration procedure for the BDT. In this way, a BDT may be scheduled by a LADN or the centralized data network (e.g., Internet). Alternatively, the UE may initiate the configuration procedure by directly communicating with the core network entities.

Referring to the example of FIG. 9, a UE 901 may initiate the procedure 900 by sending, to AMF 903 via RAN node 902, a message that indicates a request for a BDT of traffic originating from UE 901 (step 910). The request may comprise a request to pre-configure a BDT for the MO traffic. The request may be included or combined with other types of request message, such as service request, registration request, or session establishment/reactivation/modification request. Information including but not limited to the following may be included in the request: an indication that it is for MO traffic; a PDU session identifier (ID) indicating the PDU session that the UE may want to use for MO BDT, which may be an existing PDU session that goes from RAN to UPF or AMF-NEF path; a type of PDU session; an ID of the DNN of the LADN/DN as the destination of the MO traffic as the UE may be currently connecting to a DN/LADN that is different from the destination LADN of the requested data transfer; a traffic pattern of the MO data, e.g., periodic data with time interval, average data size, data rate, maximum latency, and expected starting time of the data transfer; application information related to the data to be transferred, e.g., application ID or an IP 5-Tuple (source address, destination address, source port number, destination port number, and protocol) that describes the traffic or ASP Identifier; a BDT policy ID indicating any existing BDT policy that may be stored in the network, and the existing policy may be configured for MO traffic for a different LADN or for a MT traffic; an indication of whether the UE is flexible for the destination LADN/DN since the core network entity may choose a different LADN/DN as the destination for the MO BDT considering different factors; an indication of whether the UE prefers to transfer data via a non-3GPP network; and a mobility pattern of the UE or expected UE location at the time of the background data transfer.

Upon receiving the request, AMF 903 may contact UDM/UDR 905 to determine whether UE 901 is authorized to use the BDT for its MO traffic and whether the destination LADN/DN or Address or ASP Identifier is enabled for MO BDT (step 911). If the authorization passes, AMF 903 may select an SMF (e.g., SMF 904) to manage the MO BDT configuration by considering the location of the destination LADN/DN, anchor point of the session if the PDU session already exists, and the type of session (e.g., IP or non-IP) if the PDU session has not yet been established (step 912). AMF 903 may send the BDT request to the selected SMF (e.g., SMF 904) (step 913) with the information described above with respect to step 910, step 911, and step 912. Once receiving the request from AMF 903, SMF 904 may select a PCF (e.g., PCF 906) to manage the BDT, including managing the BDT policy configuration, and to configure the MO BDT (step 914).

In order to select the proper PCF, factors including but not limited to the following may be considered: the PCF serving the destination LADN/DN; the PCF serving the UE or the network slice instance which the UE registers with; the PCF that manages the policy about the existing PDU session that may be used for MO BDT; and the PCF serving the anchor point of the PDU session that is to be established. In cases that different PCFs are involved, e.g., the UE connects to a network slice served by one PCF, and the destination LADN/DN is served by another PCF, in such a case, either PCF may be selected depending on the network operator configuration and agreement among operators. The selected PCF may communicate with the other PCF about the MO BDT policy configuration.

Alternatively, AMF 903 may select a PCF in step 912 and may send the request to PCF in step 913. For example, UE 901 may indicate that it wants to send non-IP data and may provide the ID of an existing non-IP PDU session over AMF-NEF path for MO BDT. In this case, AMF 903 selects PCF 906 in step 912, and sends the BDT request to the PCF in step 913, and steps 914 and 915 may be skipped.

SMF 904 may send the BDT request to the selected PCF (e.g., PCF 906) (step 915). PCF 906 may communicate with UDM/UDR 905 to request for subscription information and a policy profile associated with UE 901 (step 916), including whether there is any existing BDT policy configured for the UE or for the destination LADN/DN. If UE 901 provides the ID of an existing BDT policy, PCF 906 may include that in the message. In addition, the ID of destination LADN/DN, and UE ID may also be included. UDM/UDR 905 may return the BDT policy related to the UE and LADN/DN (step 917). The policy may be set up for MT traffic. UDM/UDR 905 may investigate whether any existing BDT policy is set to be shared and may be re-used via steps 916 and step 917. PCF 906 may determine the policy for the BDT for the MO traffic (step 918) based on the information received in the previous steps. The PCF may select a different LADN for MO BDT compared to the LADN requested by UE 901. The policy may include information including but not limited to the following: a BDT policy ID; a UE ID and an ID of the destination LADN/DN; a defined traffic pattern of the MO traffic, e.g., periodic data with a time interval, average data size, data rate, and an expected starting time of the data transfer; a reference to charging policy; an indication whether the MO BDT policy may be re-used (i.e., shared) by another UE or LADN/DN (in the case that the UE prefers data transfer over a non-3GPP network, the PCF may select a N3IWF and include the ID of the N3IWF); and PDU session ID and type involved for the MO BDT.

PCF 906 may request that UDM/UDR 905 store the BDT policy for the MO traffic (step 919) with the policy ID as reference. PCF 906 may send a BDT response to SMF 904 (step 920) with the policy ID and UDM/UDR ID, so that SMF 904 may retrieve the MO BDT policy in the future when it needs to establish/activate the PDU session for the data transfer. In the response message, PCF 906 may indicate the ID of LADN/DN if PCF 906 selects a different destination LADN/DN from the one identified by UE 901 for the MO traffic. SMF 904 may forward the BDT response to AMF 903 (step 921) with the policy ID and UDM/UDR ID. AMF 903 may reply to UE 901 with the BDT policy for the MO traffic via the RAN node 902 (step 922). AMF 903 may notify RAN node 902 that there is going to be a MO BDT to a LADN/DN from a UE that the RAN serves. The core network may notify the UE specific schedule of the future BDT associated with an LADN, which is selected by the core network. Given the UE's traffic pattern and/or mobility pattern, the core network may decide where the UE may start and complete its MO data transfer and what type of MO traffic in each of these locations. For example, UE 901 may perform a data download at 5 Mbps at LADN1, a video upload for 15 minutes at LADN2, a 15 minute video upload at LADN3 with a data rate at 10 Mbps, etc. AMF 903 may also pass more information about the traffic, such as periodic data with a time interval, average data size, data rate and expected starting time of the data transfer. This can be done over the N2 interface. SMF 904 may notify AF 908 residing in the destination LADN/DN about the BDT policy configured for the MO traffic, and NEF 907 may record the MO BDT policy ID and PCF ID (step 923). Alternatively, PCF 906 may perform step 923. For example, at step 923, the LADN and AF 908 may be notified that there is going to be an amount of data arriving at a given time with a certain data rate.

In the example of FIG. 9, the PCF sends the BDT policy to the UE as the response to the BDT request from the UE. The BDT policy may be sent to the SMF first and then the AMF, which forwards to UE the policy to the UE on top of the NAS message. Alternatively, the PCF may send the BDT policy directly to the AMF through the UE policy association, i.e., the PCF-AMF path. The BDT policy may be forwarded by the AMF as the payload of the NAS-MM message.

Figure 10:
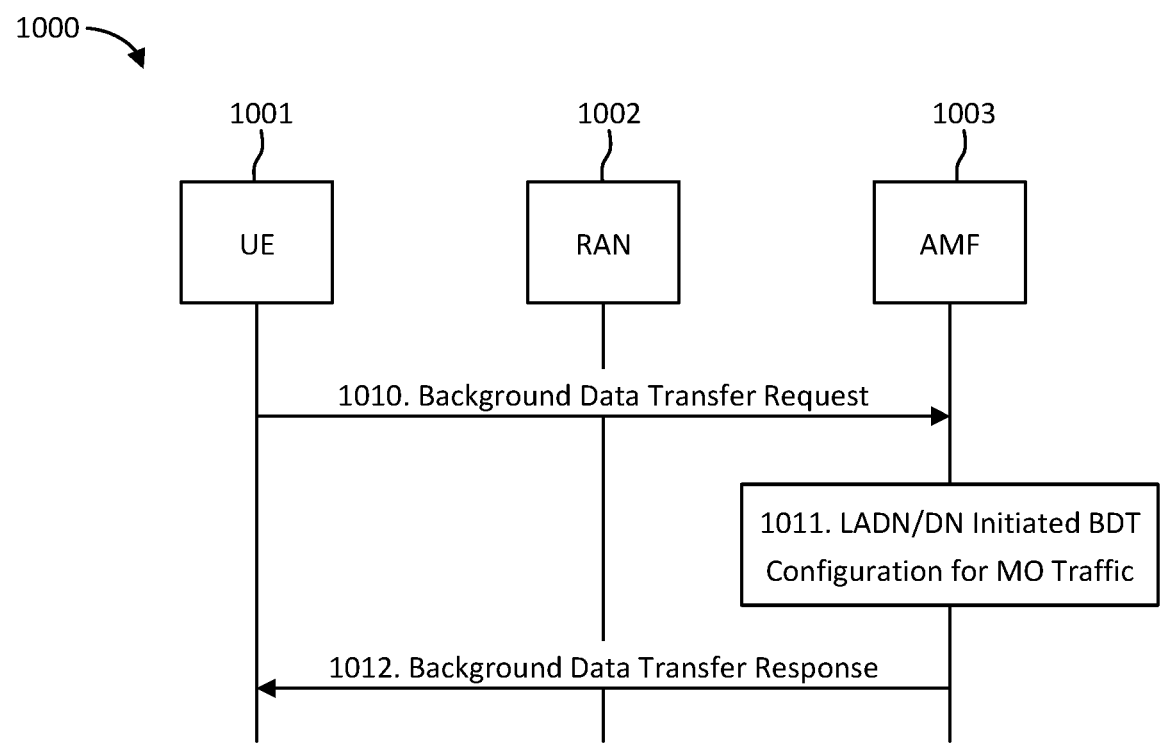
FIG. 10 is a diagram of an example procedure for BDT Configuration for MO traffic initiated by the UE and configured by DN/LADN.

FIG. 10 is a diagram of an example procedure 1000 for BDT Configuration for MO traffic initiated by the UE and configured by DN/LADN, which may be used in combination with any of the embodiments described herein. While each step of the procedure 1000 in FIG. 10 is shown and described separately, multiple steps may be executed in a different order than what is shown, in parallel with each other, or concurrently with each other. In the example of FIG. 10, the request of UE 1001 to configure MO BDT may be forwarded via RAN 1002 to AMF 1003 (step 1010), which initiates the BDT configuration procedure within core network (step 1011). The LADN/DN receiving the request may not be the one set by UE 1001 as the destination LADN/DN for the MO traffic. Instead, the LADN/DN that initiates the procedure may indicate to a network entity that it is not appropriate to receive the MO traffic due to some condition, e.g., it may be overloaded with limited bandwidth, it may not support the application related to the MO traffic, or UE 1001 may be out of its service area when MO traffic arrives based on the traffic pattern provided by UE 1001.

Figure 11:
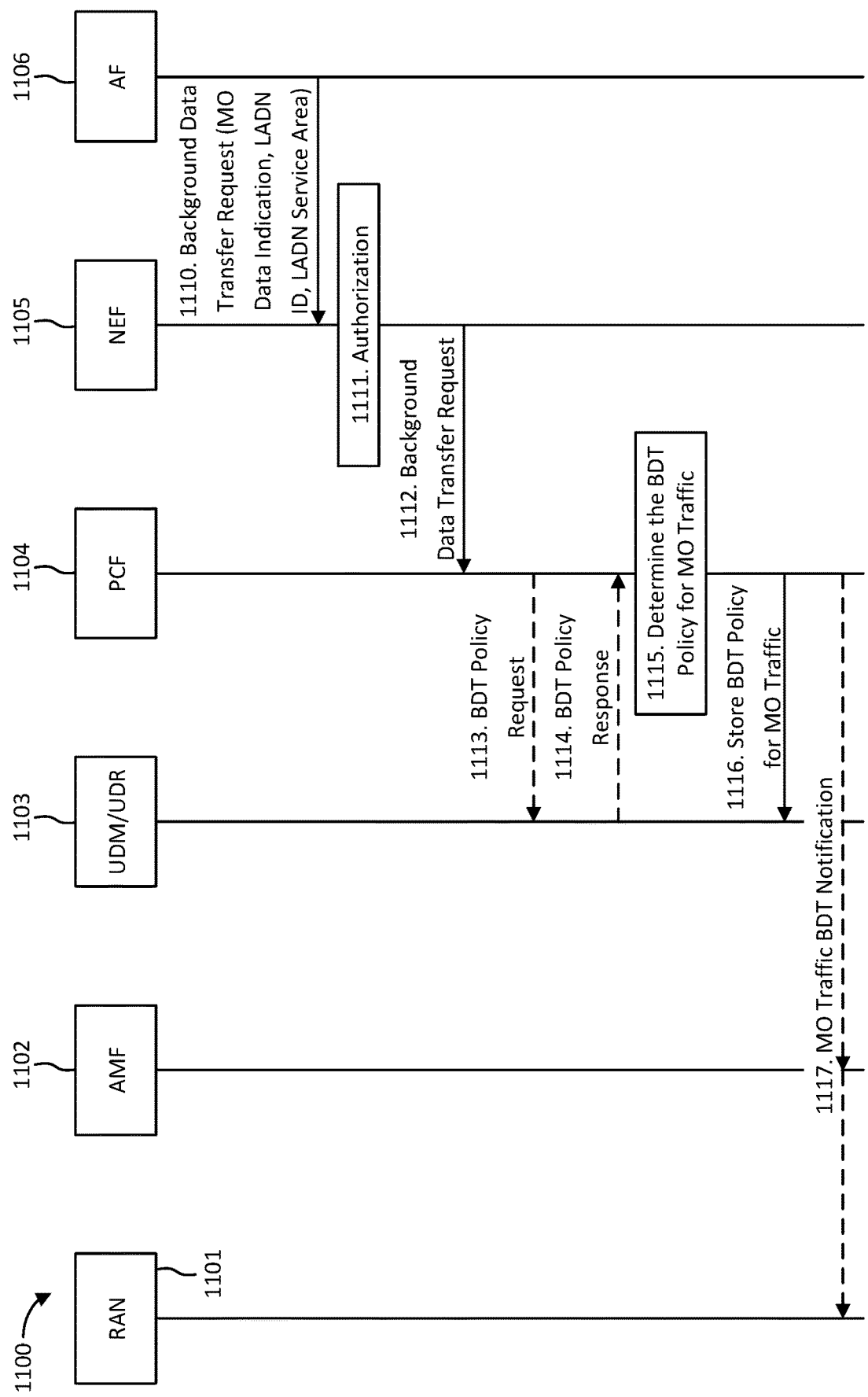
FIG. 11 is a diagram of an example procedure of BDT policy configuration for MO traffic initiated by the DN/LADN.

FIG. 11 is a diagram of an example procedure 1100 of BDT policy configuration for MO traffic initiated by the DN/LADN, which may be used in combination with any of the embodiments described herein. While each step of the procedure 1100 in FIG. 11 is shown and described separately, multiple steps may be executed in a different order than what is shown, in parallel with each other, or concurrently with each other. For example, the SCS/AS in a DN/LADN may manage a group of sensors and may set the schedule for those sensors to periodically report their measurements. In the example of FIG. 11, AF 1106 may send a BDT request to NEF 1105 (step 1110). The BDT request may indicate information including but not limited to the following: whether the request is for MO or MT traffic; the service area of the LADN if AF 1106 resides in a LADN; traffic characteristics, such as periodic data with time interval, average data size, data rate, maximum latency, and expected starting time of the data transfer; the number of UEs; conditions on the BDT, such as for example, whether AF 1003 specifies a certain condition(s) to stop the BDT such as a threshold for the amount of data transferred, and maximum amount of data transferred, etc.; whether data may be transferred over non-3GPP access; and whether the background data transfer is group based or not. NEF 1105 may then authorize the BDT request (step 1111) and then may send the BDT request to PCF 1104 (step 1112). PCF 1104 may send a BDT policy request to UDM/UDR 1103 (step 1113). UDM/UDR 1103 may send a BDT policy response to PCF 1104 (step 1114). PCF 1104 may determine a BDT policy for MO traffic (step 1115). PCF 1104 may send the determined BDT policy for MO traffic to UDM/UDR 1103, which may store the determined BDT policy for MO traffic (step 1116). RAN node 1101 may be notified by AMF 1102 about the scheduled BDT (step 1117). In addition, PCF 1004 may set up a paging policy for BDT and pass the policy to AMF 1102, so that AMF 1102 may page the UE to connect to the network at the scheduled time. This may be performed for both MO and MT traffic.

A BDT may also be group based for MT traffic. For example, a LADN/DN may send the MT data to a group of UEs. In one example scenario, MT data may be sent to all devices within a service area of a LADN via broadcast. In another example scenario, MT data may be sent to a group of devices identified by a group ID instead of an individual UE ID. In both scenarios the LADN/DN may insert new parameters when it sends a BDT request to the core network. Either a service area of the LADN or a group ID may be included in the request. A group based BDT may be especially helpful for IoT applications, since many IoT devices are constrained devices, and deployed as a group for easier management.

It is also possible that a BDT policy is setup by the PCF for the MO data transfer originated from a group of UEs. The AS/AF may initiate the procedure by sending a BDT request to the network by indicating the group ID, e.g., external group ID or internal group ID. Therefore, once the PCF determines the BDT policy, the PCF may send the policy to the AMF, which may forward to the individual UE in the group. If the AMF does not know the location of any UE, or the AMF does not connect to the UE, the AMF may contact the UDR/UDM to retrieve the UE context including the UE ID based on the group ID, so that the BDT policy may be sent to the target UE in the group.

The AMF may send one N2 message to a RAN node if it finds that multiple UEs in the group are served by one RAN node. In the N2 message, the AMF may indicate individual UE ID, group ID or both. It may be up to RAN node to decide how to send the policy to an individual UE, while the PCF sends one message to the AMF with the BDT policy indicating only the group ID. In order to avoid the case that a large number of UEs sending data or control messages to the network at the same time, there is a back-off timer associated with the policy. More details are described below.

Table 3 below provides a list of parameters that may be associated with a background data transfer policy that is sent to the UE by the network.

presence of the indication, subscribe to the AMF for a notification when the UE (or group of UEs) enters the location or geographical area that was indicated in the request. When the notification is received from the AMF, the PCF may send the policy to the UE (via the AMF and NAS signaling).

TABLE 3

| Parameter | Description |
| --- | --- |
| Reference ID | This is used as a reference to this BDT policy |
| UE ID or Group ID | For MO data, this indicates the UE or a group of UEs that are going to send data in the future over the PDU session established based on the policy. For MT data, this represents the receiver of data from AF/AS. |
| S-NSSAI(s) | Identify the network slice that can support the background data transfer based on this policy. Particularly, this may imply what type of service in the background data transfer, such as V2X, mIoT. |
| ASP ID | Identify the application service provider that is involved in the scheduled data transfer |
| Back-off timer | Indicate a range of time. This is used by UEs or AF/AS when there are a group of UEs involved in the scheduled data transfer. For MO data transfer, when scheduled starting time arrives, each UE in the group will randomly pick a time offset and wait for the time offset to initiate the session establishment procedure with network, so that network can avoid huge number of UEs sending request or data at the same time. For MT data transfer, when scheduled starting time arrives, AF/AS will randomly pick a time offset for each UE included in the group and wait for the time offset to start data transfer in the network, so that network can avoid congestion by sending data to a huge number of UEs at the same time. |
| Policy ID | A reference ID identify this BDT policy |
| Traffic characteristic | Indicate parameters to identify the scheduled data traffic, such as total amount of data, max data rates, and periodicity of data traffic. |
| Traffic Description | A 5-Tuple, Application Identifier, Application Descriptors, or traffic filter that describes traffic that may use the policy. Application Descriptors may comprise OSId and OSAppId(s). The terms Application Descriptor and Application ID may be used interchangeably herein. |
| Time window | Indicate the start time and end time for the scheduled data transfer. May also indicate this is a periodic data transfer. |
| Offset indicator | An indication that the UE should apply an offset time, an explicit offset value that should be applied to the start and end of the time window, or a value that can be used to randomly generate an offset, or a method for generating an offset. |
| DN/LADN | Indicates the DNN of the DN or LADN hat is associated with the future data transfer |
| ASP ID | Indicates the ASP that is associated with the future data transfer |
| Geographic area granularity | Indicate the granularity of the geographic area information, such as tracking area, and registration area. |
| Geographic area information | Indicate the area information that the policy is applied for future data transfer |
| PDU session type | Indicate the type of PDU session that will be created for the future data transfer, such as IP or non-IP. |
| Reference to a charging policy | A reference to a charging policy that is used for charging the future data transfer |
| Re-usable indicator | Indicate if this BDT policy can be re-used by other UE, group of UEs, LADN/DN, and/or different directions (i.e., MO and MT data). |
| SSC mode | Indicate the session and service continuity mode that will be supported for the future data transfer. |
| Data direction | Indicate which direction (i.e., UL, DL or both) the data traffic is transferred following this BDT policy |

In one example, a background data transfer policy may be a part of UE Route Selection Policy (URSP), that may be managed and distributed with URSP framework.

An AF may send a BDT request to the NEF that indicates that the AF would like to create a BDT policy for a UE or a group of UEs. Besides indicating BDT details such as data size, area/location and time window, the request may indicate that the policy is to be used for UE initiated communications. This indication may be referred to herein as a MO-BDT-Policy indication. The NEF may forward this request to the PCF, and the PCF may formulate a policy. The PCF may then use the MO-BDT-Policy indication as a trigger to immediately send the policy to the UE (via the AMF and NAS signaling), or the PCF may, based on the When the UE receives a BDT transfer policy, the contents of the policy may cause the UE to perform one or more of the following actions:

1) Determine to activate the policy: the determination to activate the policy may be triggered by any combination of the following events: reception of the BDT policy, when the UE detects that it has entered a location or geographical area that was indicated in the received policy, when the UE detects that the DNN that was indicated in the policy is available, once the UE has successfully established a PDU session with the DNN that was indicated in the policy, when the time window that was indicated in the policy is reached, or when the UE detects traffic that matches the filter or 5-tuple information that was listed in the policy. When the UE determines to activate the policy, it may delay policy activation by an offset. The offset may be indicated in the policy or may be based on a random generator and/or the part of a UE identifier such as the UE's SUPI or 5G-S-TMSI. The time window may also be shifted by the offset.

2) Policy Activation Request: when the UE decides to activate the policy, it may take one of the following steps:

Send a Registration Update Request that requests to connect to a new network slice, which may include an S-NSSAI that was provided in the policy.

Send a PDU Session Establishment Request, which may include a DNN that was provided in the policy. The PDU Session Establishment Request may also include a policy reference ID (or policy ID) to identify the policy that was received from the PCF. The policy reference ID may be used by the SMF to retrieve the policy from the PCF and apply the policy to the PDU session.

Send a PDU Session Update Request or a Service Request. The UE may select the PDU Session that is associated with the PSU Session Update Request or a Service Request based on the S-NSSAI, DNN, ASP Identifier, 5-Tuple, and/or PDU Session ID that was provided in the policy. The PDU Session Update Request or a Service Request may also include a policy reference ID to identify the policy that was received by the PCF. The policy reference ID may be used by the SMF to retrieve the policy from the PCF and apply the policy to the PDU session.

3) Policy Activation Notification: once the policy has been activated, the UE may send a notification to an application on the UE letting the UE Application know that the policy has been activated. The notification may include the time window, amount of data, 5-tuple, application ID, ASP ID, and location where the BDT policy may be active. The UE may further send a notification to the UE application letting it know when the BDT is no longer active (outside the time window, amount of data exceeded, outside the location, there is no longer a PDU Session to the DDN, etc.). Alternatively, the UE may let the application know about the availability of the policy before the UE activates the policy with the network. This may be done to ensure that the UE application wants to use the policy. Alternatively, the UE might not give the policy information to the UE application until the UE application generates some traffic that matches the traffic pattern (e.g. a filter) that was specified in the policy. Policy information may be provided to the UE application via an AT command.

4) Deactivation of the Policy: The UE may decide to deactivate the policy because it detects that the UE has left the area that is specified in the policy, detects that the UE has sent an amount of data that is greater than or equal to what was specified in the policy, detects that the time window that was specified in the policy has expired, detects that the traffic that was specified in the policy has not been sent since a specified time out (the time out might have been specified in the policy), or receives an explicit application layer request. Deactivation of the policy may entail sending a PDU session modification, PDU session release message, a registration update message that removes the S-NSSAI that was specified in the policy. The policy may indicate what should trigger the release of the PDU session (time out, outside of time window, data amount matched, or exceeded, etc.)

The UE may want to re-negotiate the BDT policy with the network even after the policy is determined by the PCF and sent to UE. Possible scenarios could be that UE expects some changes for the previous planned data transfer, for example, when the UE wants to change the starting time and/or end time of data transfer, when the UE wants to transfer more data or wants a higher data rate in the PDU session set by BDT policy, or when the UE wants to add additional application data flows into the BDT. In order to re-negotiate (i.e., update) the configured BDT policy with network, the UE may initiate the procedure along with a registration update procedure, service request procedure, or PDU session enablement/modification procedure. Specifically, the UE may need to identify the BDT policy by giving a reference ID or BDT policy ID, to indicate the cause for the update and the parameters to be changed associated with the BDT policy. The parameters to be changed may comprise any of the parameters that are listed in Table 3.

The AF or network functions such as PCF may also want to update the BDT policy that is stored at UE due to following events: the service area of a LADN or DN is changed, which may impact the future background data transfer; traffic characteristics of the future background data transfer changes, so that the AS or AF may want to change the configuration of the BDT policy; the network detects that the UE may be unreachable or move out of the area that is specified in a BDT policy. This may be done by the assistance of the NWDAF in the network. Once the NWDFA detects this, it may contact the PCF to trigger the process by indicating the BDT policy and the associated UEs. The network function may utilize the UE configuration update procedure to update the BDT policy by indicating the reference ID or BDT policy ID, the cause for update, and the parameters to be changed that are associated with the BDT policy.

Figure 12:
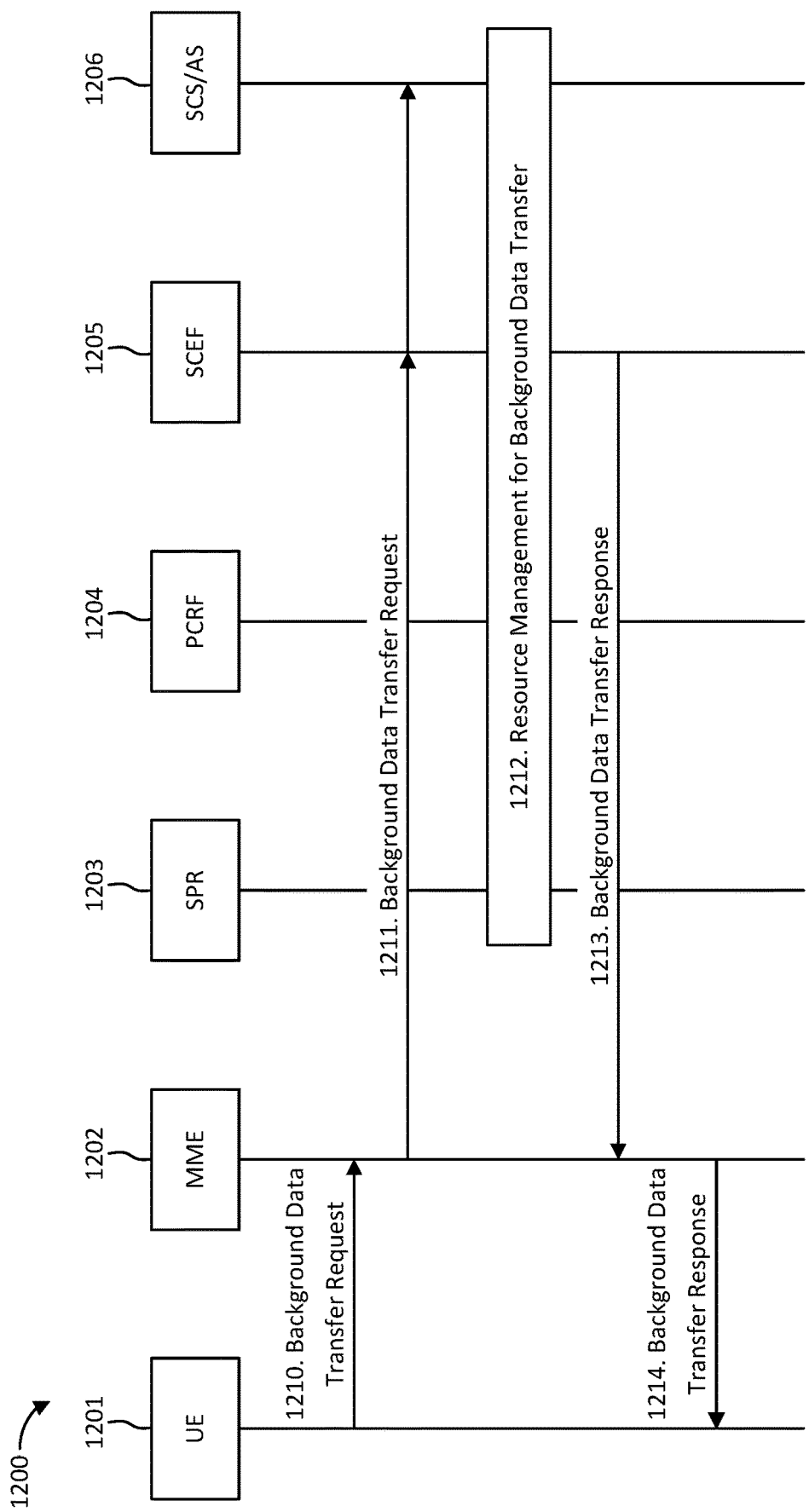
FIG. 12 is a diagram of an example procedure for a UE initiated procedure of configuring a BDT policy for MO traffic in EPC.

FIG. 12 is a diagram of an example procedure 1200 for a UE initiated procedure of configuring a BDT policy for MO traffic in the LTE EPC, which may be used in combination with any of the embodiments described herein. While each step of the procedure 1200 in FIG. 12 is shown and described separately, multiple steps may be executed in a different order than what is shown, in parallel with each other, or concurrently with each other. In the example of FIG. 12, UE 1201 may send a MO background data transfer request to MME 1202 via NAS (step 1210), and MME 1202 may forward the request to SCS/AS 1206 via SCEF 1205 (step 1211). UE 120 may include the same information in the BDT request as described in any of the procedures described herein. SCS/AS 1206 may initiate the procedure of BDT configuration including resource management (step 1212) by indicating this is for MO traffic with the UE ID. SCEF 1205 may send a BDT response to MME 1202 (step 1213) with the policy ID that is set by PCRF 1204 and stored in SPR 1203. MME 1202 may send a BDT response to UE 1201 (step 1214) with the policy ID for the MO BDT.

Figure 13:
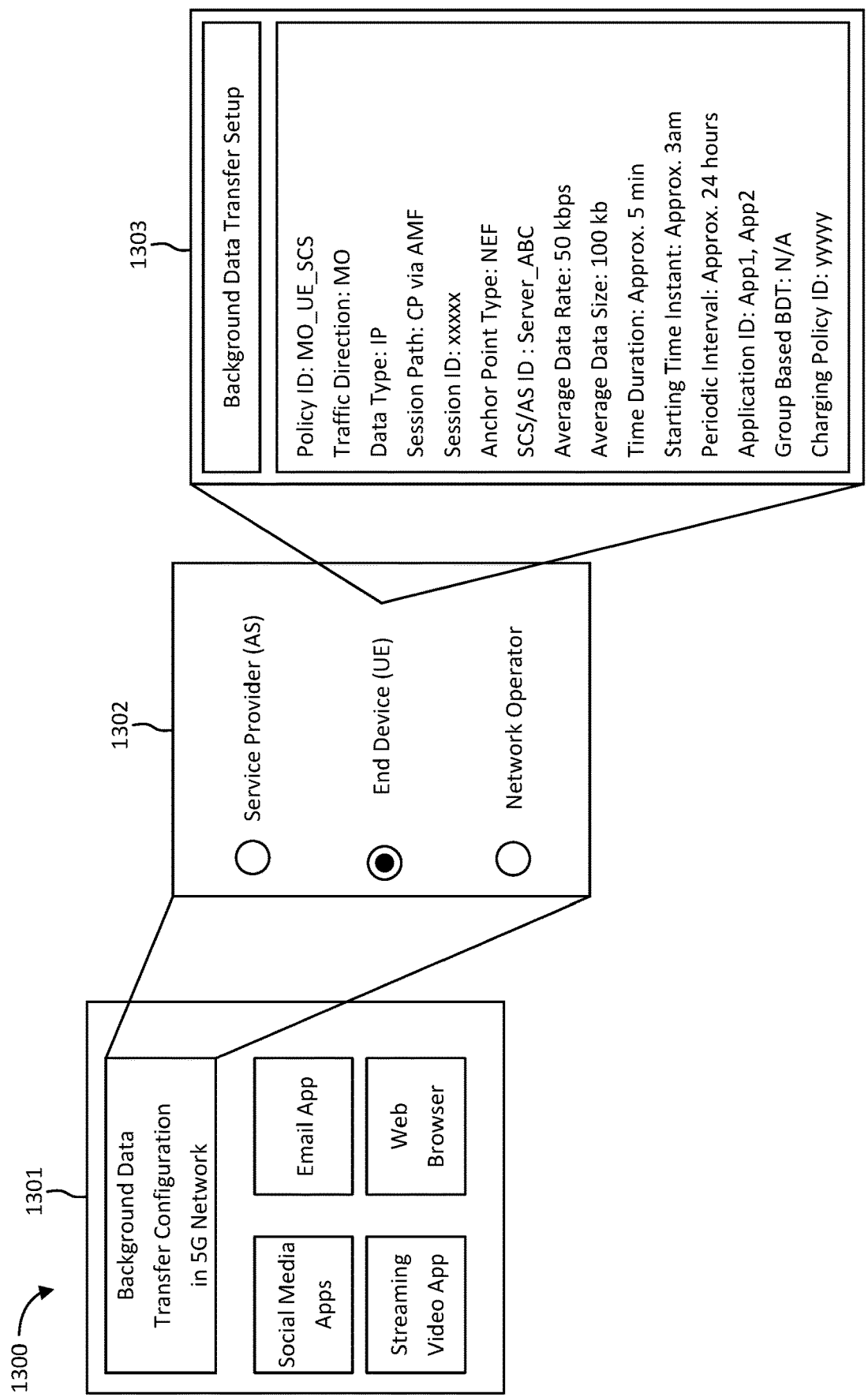
FIG. 13 is a diagram of an example user interface for configuring the background data transfer in 5G network.

FIG. 13 is a diagram of an example user interface 1300 for configuring the background data transfer in 5G network. The user interface may be used by end device (UE), service provider (SCS/AS), as well as the network operator. As shown in the example of FIG. 13, a BDT configuration in 5G network interface 1301 may enable configuration of the end device (UE), service provider (SCS/AS), and/or the network operator 1302, and the respective BDT setup for end device (UE), service provider (SCS/AS), and/or the network operator 1303.

Figure 14:
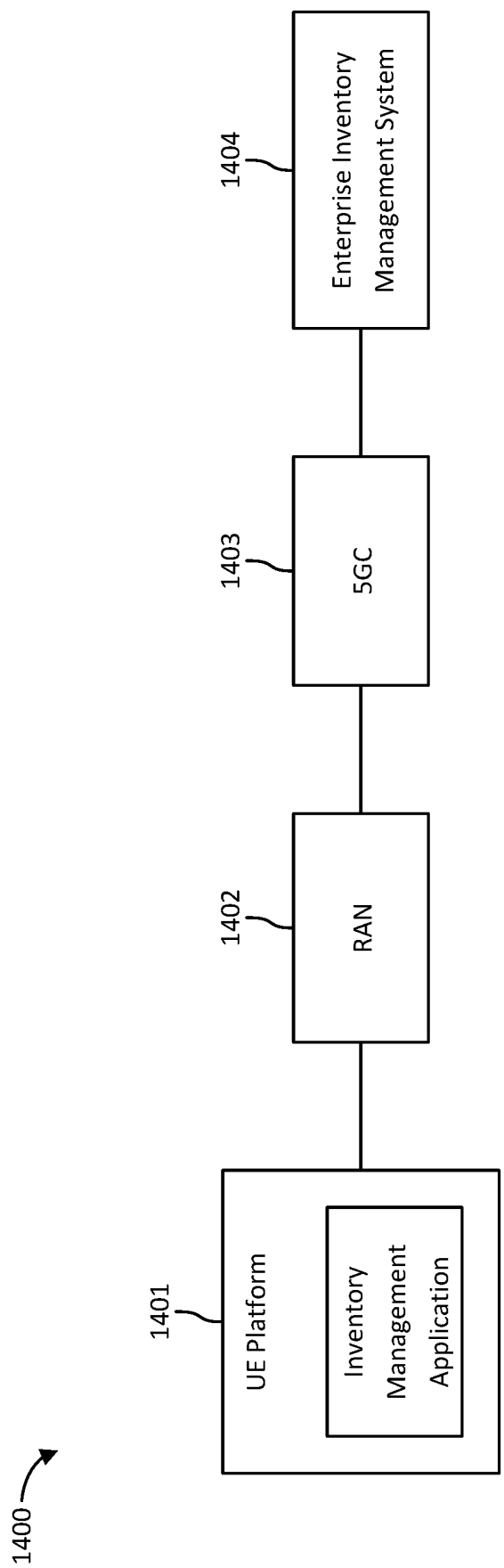
FIG. 14 is a diagram of an example of a UE connecting to an inventory management system.

FIG. 14 is a diagram of an example of a UE connecting to an inventory management system 1400. In the example of FIG. 14, UE platform 1401 may include an inventory management application, which may connect to 5GC 1403 via RAN 1402 in order to access enterprise inventory management system 1404. Some applications may only operate when the device (UE) that hosts them are in the service area of an LADN. For example, it may be desirable for a warehouse inventory tracking and management application (as shown in the example of FIG. 14) to only operate when the UE is in the warehouse. In other words, for security reasons, the warehouse owner may not want employees to be able to observe and manage inventory from home.

Although, the UE may have IP connectivity when the UE is outside the service area of the LADN, it does not have connectivity to the enterprise inventory management system 1404. Thus these applications may be aware of whether the UE is inside or outside the LADN and that they should not try to operate when the UE is not in the LADN, To provide finer granularity of access to a LADN, from service/application perspective, 5GC 1403 may perform the authorization procedure based on different services provided by the LADN. LADN is expected to assist 5GC 1403 by providing some service/application information. One way is to define different service areas for different services the LADN provides. 5GC 1403 (e.g., PCF) may maintain a mapping between the service areas and services. In fact, the service area may vary depending on other factors, such as traffic load, and mobility pattern.

In such a scenario, when the UE leaves the service area of the LADN, the application's session with the back end enterprise inventory management system 1404 may be paused. 5GC 1403 may support this type of scenario by saying that when the SMF may deactivate the UE's user plane connection when the UE moves out of the LADN service area and that the SMF may reactivate the UE's user plane connection when SMF is informed that the UE has moved back into the service area. The API's that are exposed by UE platform 1401 and used by the inventory management application may account for the fact that the UE's user plane connection is dependent on the UE's location.

When the Inventory Management Application starts, it may call an API that may cause the UE's user plane connection to be established. For example, the API call may be a request to establish a UDP or TCP or with the IP Address of the Enterprise Management System. The API call may include the LADN name and an indication that the LADN is a LADN name. In response to the API call, the UE platform may send a PDU Session Establishment message to AMF. The message may indicate that the request type is "Initial Request," it may include the DDN/LADN and a new indication that indicates that the LADN is a LADN name. The indication that the LADN is a LADN name that may be used by the network so that the network knows that the DDN name is not to be substituted with a more general DDN if the name is not recognized within the network. Instead, if the network does not recognize the provided DDN/LADN, the network may reject the request with a cause value that indicates that the LADN/DDN name is not recognized, cannot be reached, or is not permitted. A GUI may display a message indicating whether the application is connected to the enterprise system.

Figure 15:
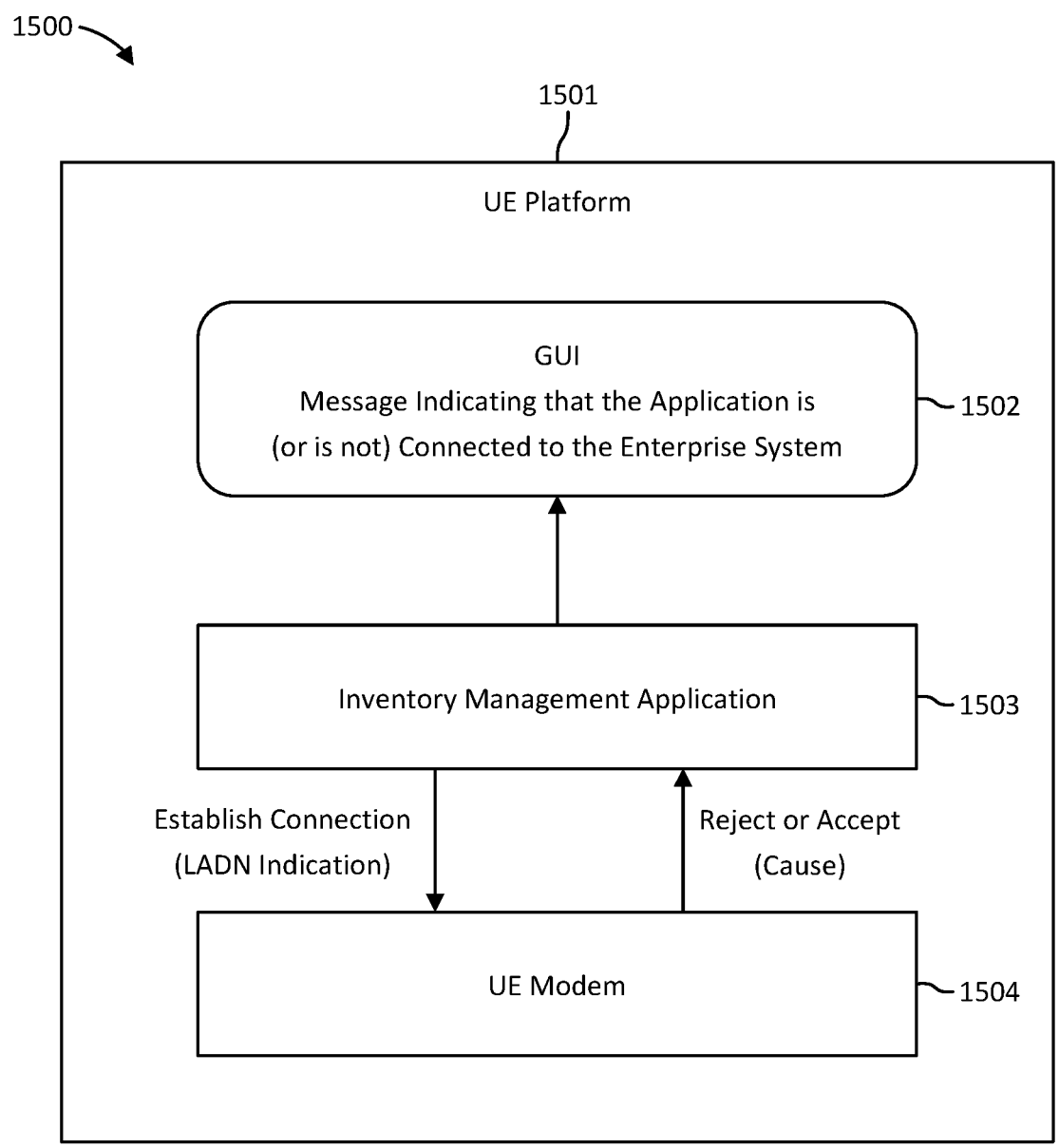
FIG. 15 is a diagram of an example for establishing a connection to the LADN.

FIG. 15 is a diagram of an example for establishing a connection to the LADN 1500, which may be used in combination with any of the embodiments described herein. UE platform 1501 may include a graphical user interface (GUI) 1502 to display a message indicating that whether application is connected to the enterprise system. Inventory management application 1503 may send a request to establish a connection (LADN indication) to UE modem 1504 and may receive a rejection of accept message (cause) from UE modem 1504. The PDU session establishment message may already include a DDN field. The DDN field may be used to provide the LADN to the network.

LADN information, including the tracking areas where the LADN may be reached, may be provided by AMF to the UE during the registration procedure or UE configuration update procedure. When the UE detects that it leaves the area where the LADN may be reached, the UE platform may send a notification to the inventory management application indicating that the user plane connection has been paused. The UE may detect that it left the LADN area when it determines that it has entered a tracking area that is not part of the LADN. The user interface of the inventory management application may display a "good bye" message on the handset screen indicating that the enterprise management system is not reachable in the current location. When the UE detects that it has reentered the area where the LADN may be reached, the UE platform may send a notification to the inventory management application indicating that the user plane connection has been re-established. The user interface of inventory management application may display a "welcome back" message on the handset screen indicating that the enterprise management system is reachable in the current location.

When the UE re-enters the LADN area, it may not know if the network deactivated the UE's PDU session or not. Thus, the UE may send a PDU session establishment message with a request type that indicates "Existing PDU Session" and the PDU Session ID. Additionally, the request may include an indication that the request is to reactivate a session on the same access (i.e. 3GPP or non-3GPP). The AMF may reply with an indication of whether or not the PDU Session is still established or whether a new PDU Session has been established to replace the previous session. The indication may be provided to the UE with either the same PDU Session ID or a new PDU Session ID to the UE. The UE may detect that it entered the LADN area when it determines that it has entered a tracking area that is part of the LADN. Notifications, that were set up to be sent to the inventory management application when the UE reenters the area where the LADN may be reached, may instead be sent after the UE re-established a PDU session with the LADN.

Figure 16:
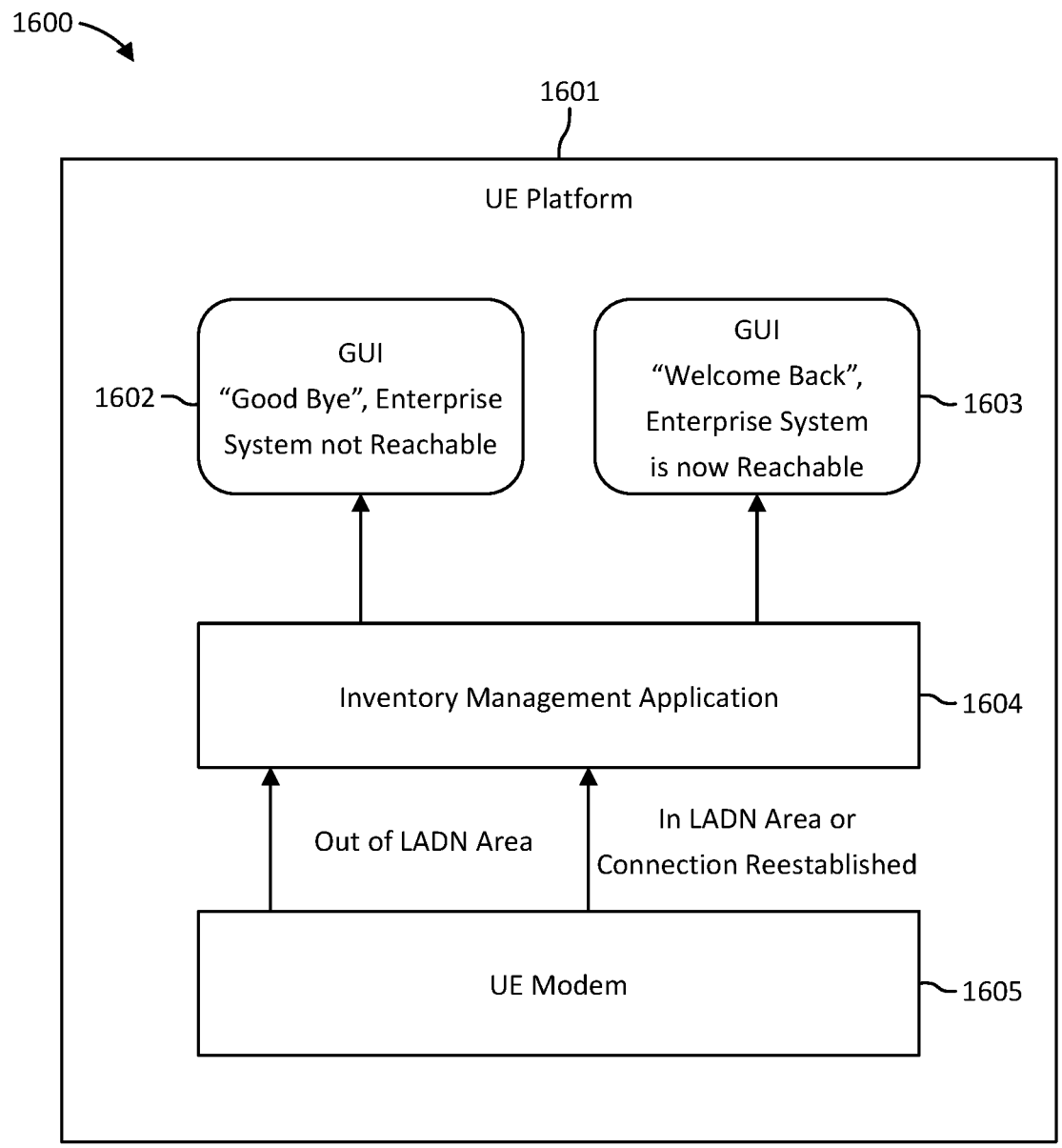
FIG. 16 is a diagram of area notifications via a graphical user interface (GUI)

FIG. 16 is a diagram of area notifications via a GUI 1600, which may be used in combination with any of the embodiments described herein. UE platform 1601 may include UE modem 1605, which may send an out of LADN area message to inventory management application 1604, which may display a message indicating that the enterprise system is not reachable (e.g., a "good bye" message) via graphical user interface (GUI) 1602. UE modem 1605, which may send an in LADN area or connection reestablished message to inventory management application 1604, which may display a message indicating that the enterprise system is now reachable (e.g., a "welcome back" message) via graphical user interface (GUI) 1603.

There may also be service layers that only operate in an LADN. The inventory management application that was described above may be a service layer that is hosted on a UE. In oneM2M terminology, this may be referred to as an ASN-CSE. Alternatively, it may be an ADN-AE.

The enterprise inventory management system that was described above may be a service layer that is hosted in a cloud server. In oneM2M terminology, this may be an IN-CSE.

The ASN-CSE on the UE may perform a registration procedure with the IN-CSE. The IN-CSE may provide the ASN-CSE with an indication that the IN-CSE is only accessible when the ASN-CSE is in certain geographical regions. Furthermore, the IN-CSE may provide the ASN-CSE with the details of the geographical region. The details of the geographical region may include but are not limited to GPS coordinates, longitude, latitude, an address, a tracking area, a tracking area list, etc.

The ASN-CSE may maintain a location attribute or resource. The ASN-CSE may make its location attribute or resource visible to applications that are registered to the ASN-CSE (e.g., applications that are hosted on the UE). The ASN-CSE may also allow applications that are registered to it view the geographical information that indicates when the IN-CSE is reachable. The information may be part of the <remoteCSE> resource that is maintained on the ASN-CSE and represents the IN-CSE.

Applications that are registered to the ASN-CSE may subscribe to receive notifications from the ASN-CSE when the UE leaves or enters the geographical area where the IN-CSE is reachable.

As described above, the ASN-CSE may receive notifications from the modem platform when the UE enters to re-enters the LADN area. After receiving such a notification, the ASN-CSE may update an attribute or resource to indicate that there is, or is not, an active connection to the IN-CSE. The updated attribute or resource may be associated with ASN-CSE (in oneM2M terms the <cseBase> resource), associated with the IN-CSE (in oneM2M terms the <remoteCSE> resource), or associated with each application that is registered with the ASN-CSE (in onceM2M terms, the <AE> resource). Applications that are registered with the ASN-CSE may subscribe to receive notifications whether the UE is in the LADN or whether the IN-CSE is reachable by subscribing to the state changes of a corresponding attribute or resource. When the application receives such a notification, it may pause its activity (in the case where the IN-CSE not reachable and/or the UE is out of the LADN) or restart its activity (in the case where the IN-CSE is now reachable and/or the UE is in the LADN).

In addition, an ASN-CSE may register with multiple IN-CSEs, where each IN-CSE is responsible for different service layers and has its own LADN. As such, ASN-CSE may maintain multiple <remoteCSE>, each for an IN-CSE associated with a different LADN. Applications on the UE may be specific to a LADN (i.e. a specific IN-CSE) and may subscribe to the corresponding <remoteCSE> to receive notifications when the UE leaves or re-enters the area where the LADN and the IN-CSE can reach.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 17A:
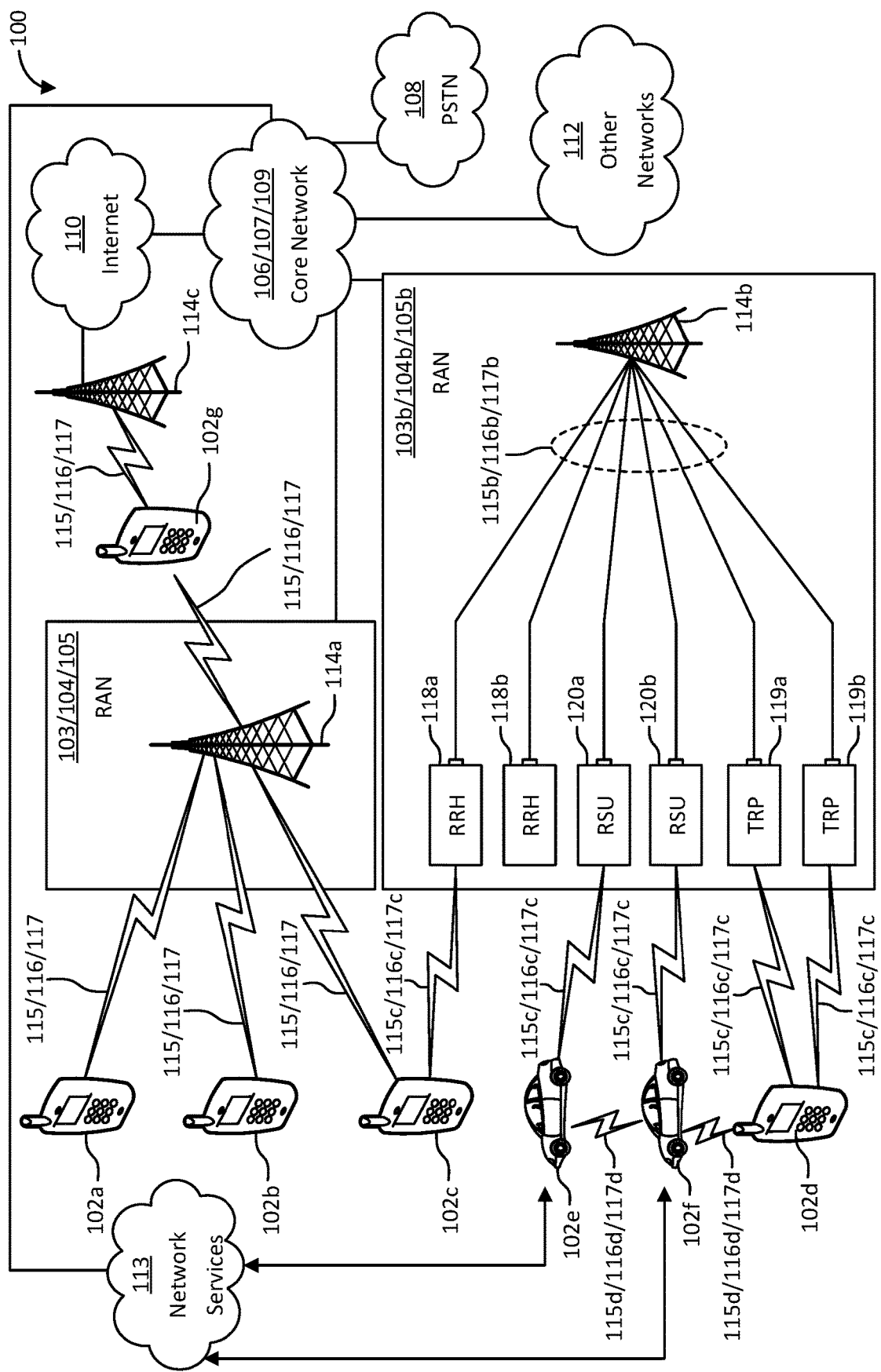
FIG. 17A illustrates an example communications system.

FIG. 17A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 17A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 17A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPS 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 17A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 17A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 17A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 17A may be configured to communicate with the base station 114a, which may employ a cellular-based radio technology, and with the base station 114c, which may employ an IEEE 802 radio technology.

Although not shown in FIG. 17A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 17B:
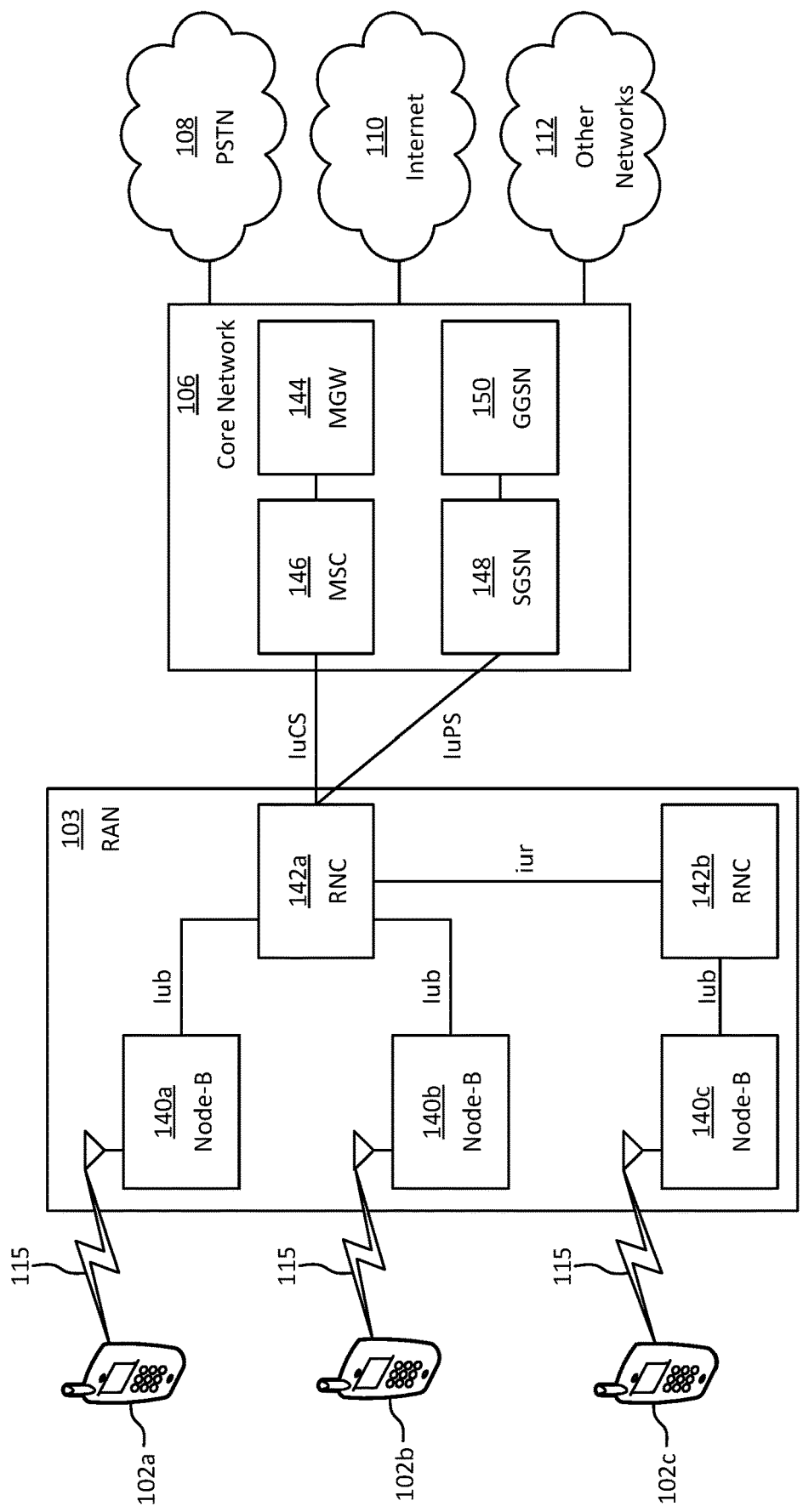
FIG. 17B is a system diagram of an example RAN and core network.

FIG. 17B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 17B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 17B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 17B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 17C:
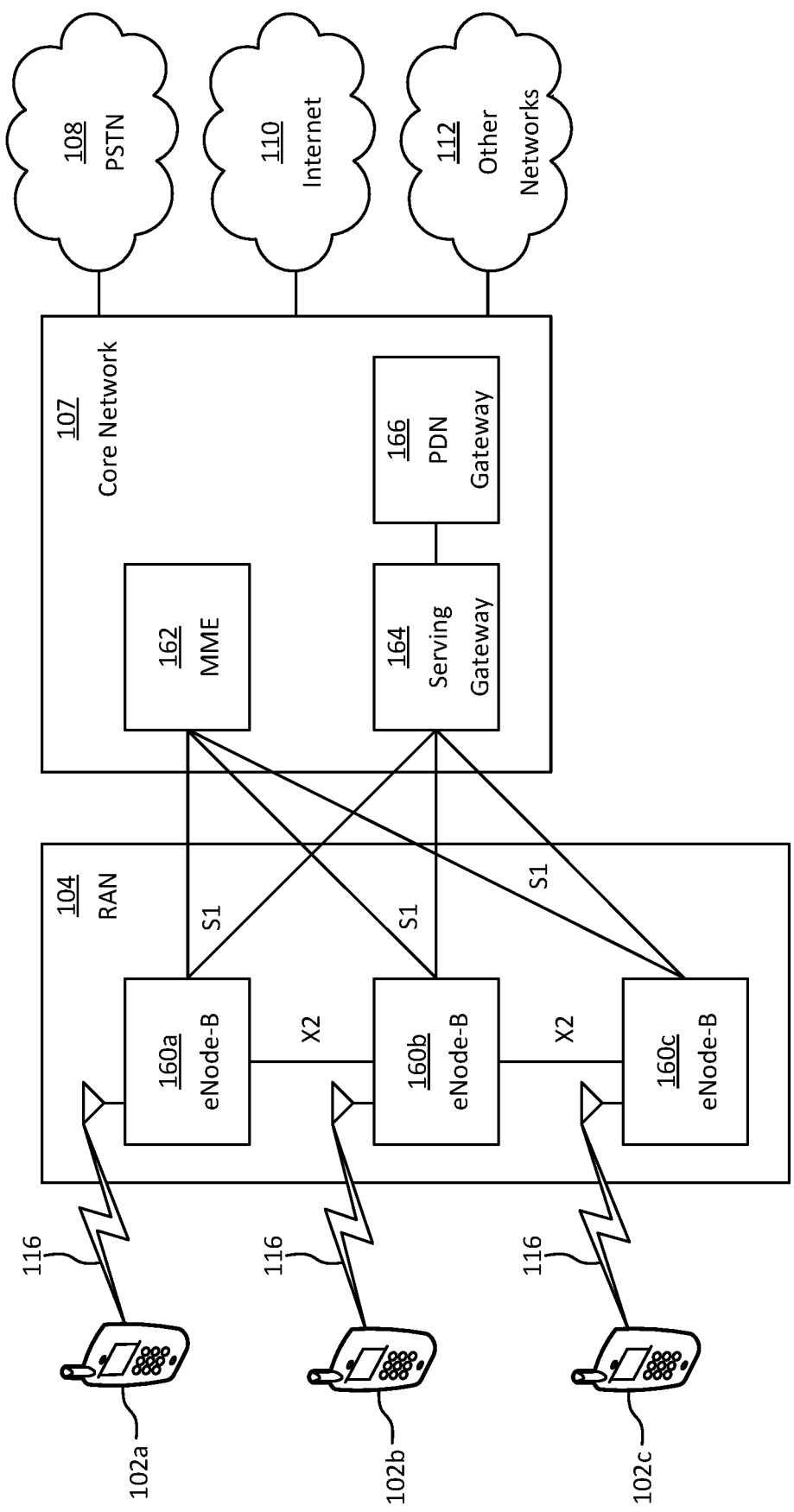
FIG. 17C is a system diagram of an example RAN and core network.

FIG. 17C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 17C, the eNode-Bs 160a, 160b, and 160c may communicate with one another over an X2 interface.

The core network 107 shown in FIG. 17C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 17D:
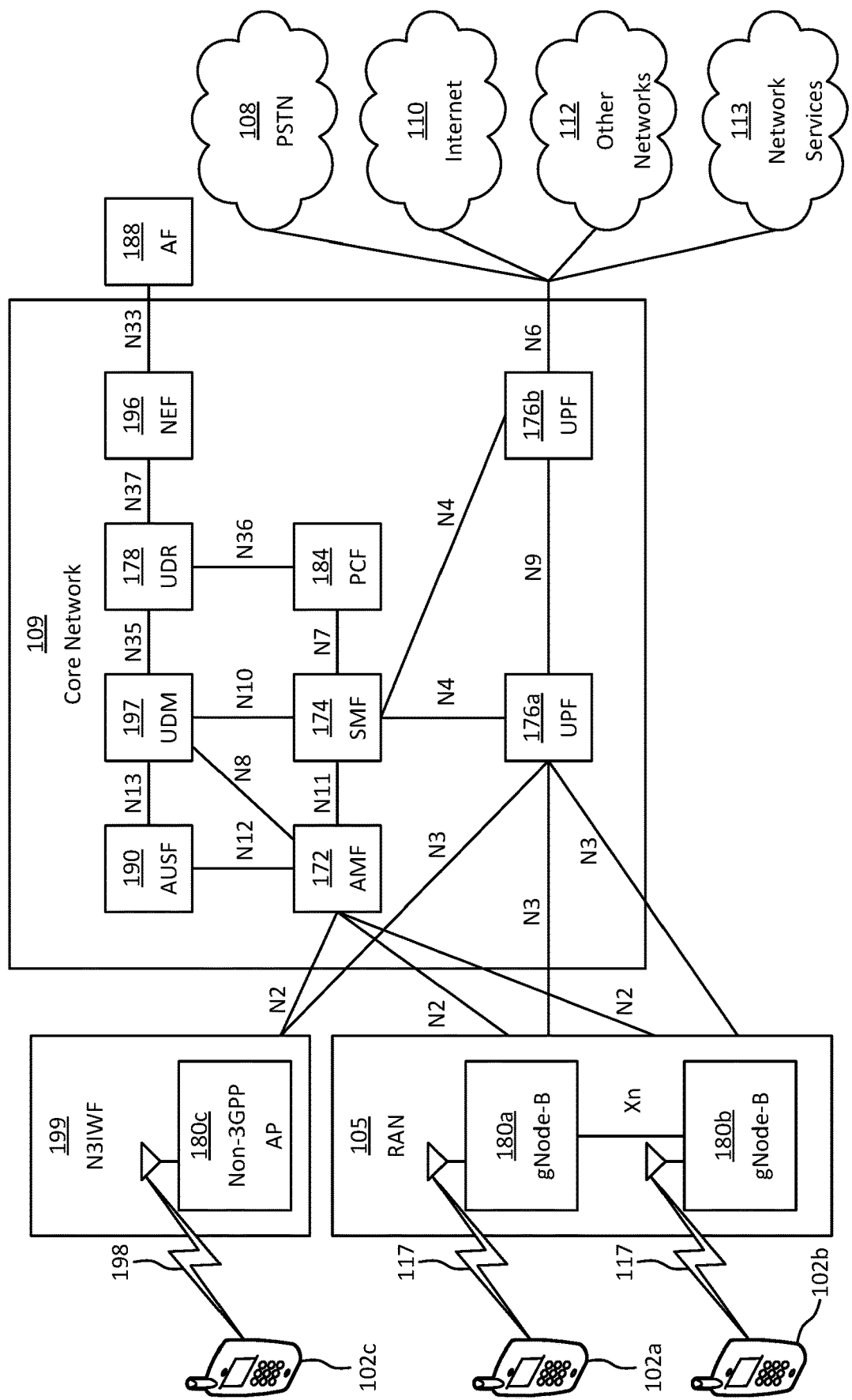
FIG. 17D is a system diagram of an example RAN and core network.

FIG. 17D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 17D, the gNode-Bs 180a and 180b may communicate with one another over an Xn interface, for example.

The core network 109 shown in FIG. 17D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 17G.

In the example of FIG. 17D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 17D shows that network functions directly connect to one another, however, it should be appreciated that they may communicate via routing agents such as a diameter routing agent or message buses.

In the example of FIG. 17D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 17D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 17D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 17D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 17E:
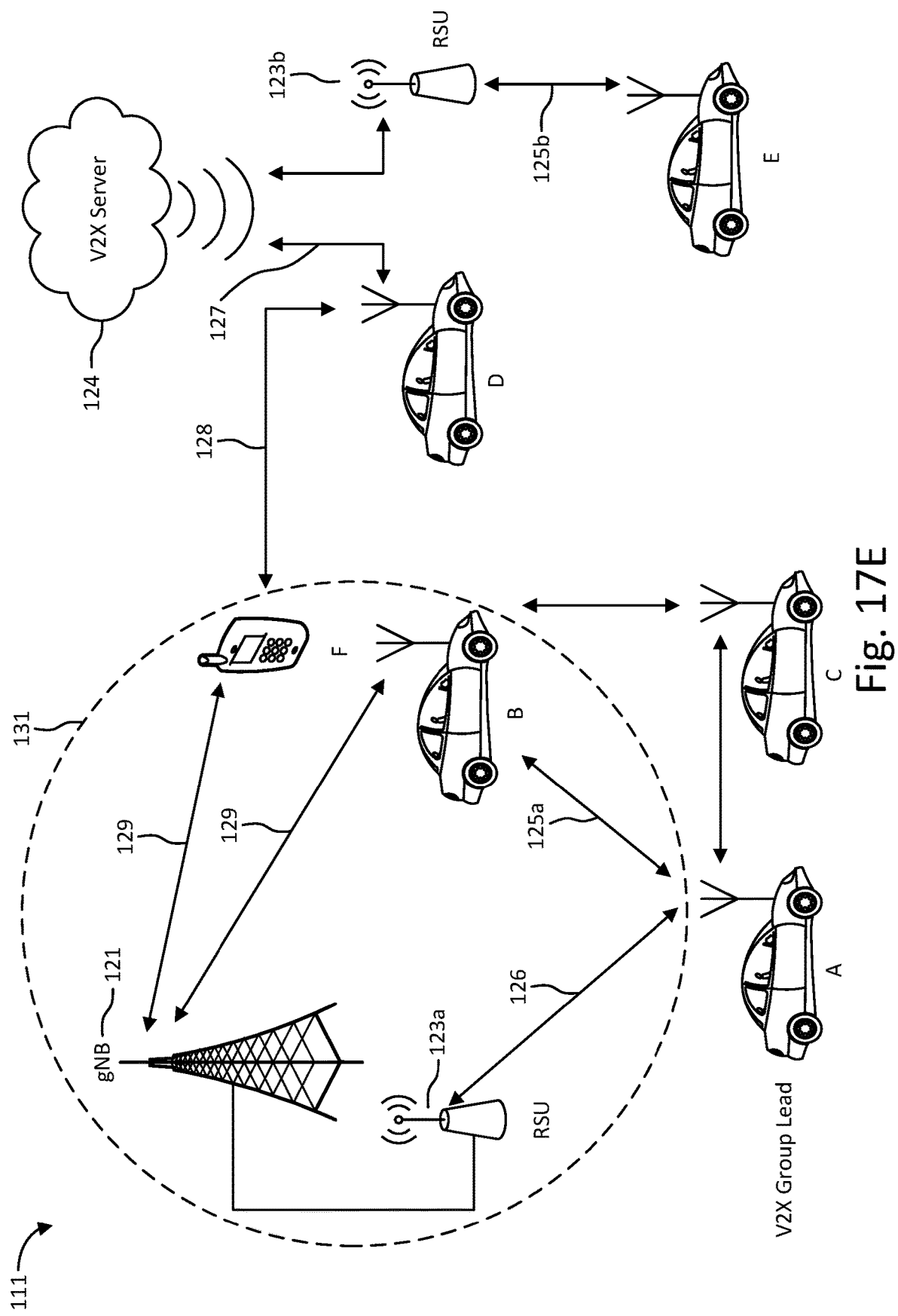
FIG. 17E illustrates another example communications system.

FIG. 17E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 17E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 17E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 17F:
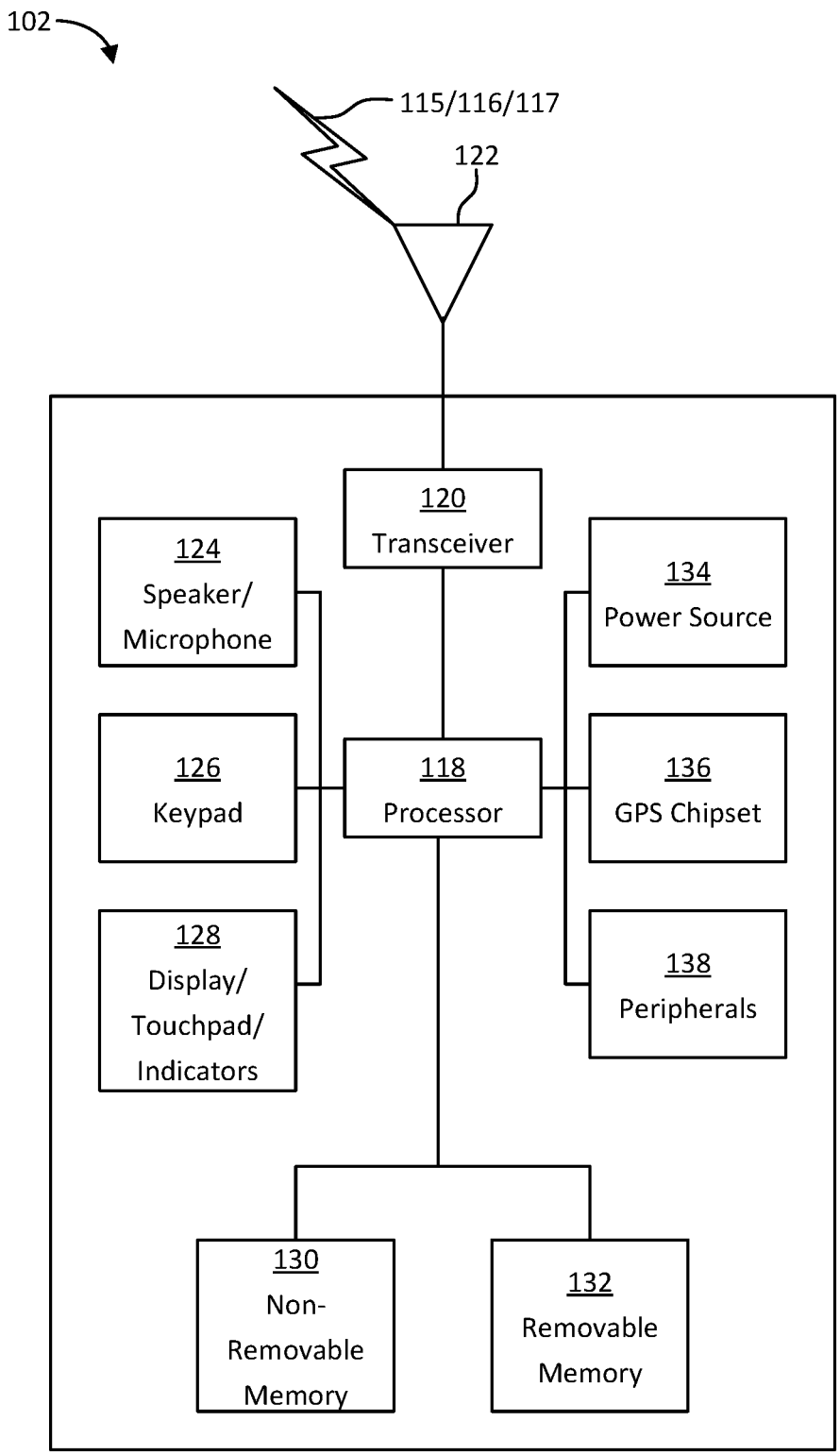
FIG. 17F is a block diagram of an example apparatus or device, such as a WTRU.

FIG. 17F is a block diagram of an example apparatus or device WTRU 102 that may be configured for wireless communications and operations in accordance with the systems, methods, and apparatuses described herein, such as a WTRU 102 of FIG. 17A, 17B, 17C, 17D, or 17E. As shown in FIG. 17F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 17F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 17F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 17A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 17F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 17G:
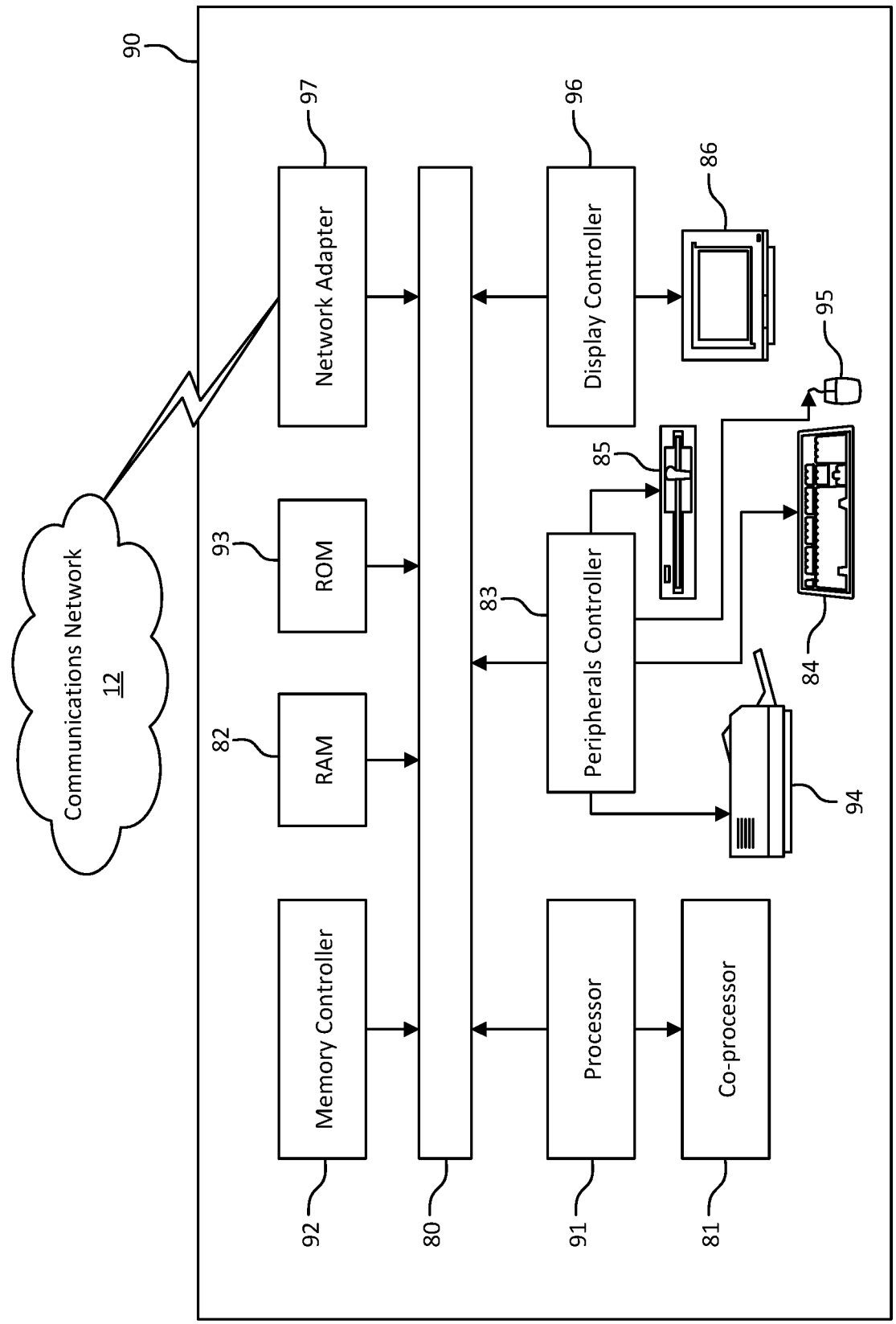
FIG. 17G is a block diagram of an exemplary computing system.

FIG. 17G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. An apparatus comprising:
    a processor and memory, wherein the processor and memory are configured to:
    send, to a database, a request for first information indicating a background data transfer (BDT) policy for a wireless transmit/receive unit (WTRU);
    receive, from the database, a response comprising second information indicating the BDT policy and a location associated with the BDT policy;
    receive a notification when the WTRU enters the location; and
    send, as part of a UE route selection policy (URSP) and based on the received notification, to the WTRU, a message indicating the BDT policy for a data transfer and a data network to service the data transfer.

2. The apparatus of claim 1, wherein the apparatus comprises a policy control function (PCF).

3. The apparatus of claim 1, wherein the request includes a BDT policy identifier or a reference identifier that is associated with the BDT policy.

4. The apparatus of claim 1, wherein the message indicates a time to initiate the data transfer.

5. The apparatus of claim 1, wherein the processor and memory are further configured to:
    cause storage of the BDT policy.

6. The apparatus of claim 1, wherein the BDT policy comprises at least one of:
    time window and network area information indicating when and where the BDT policy can be applied for the data transfer.

7. The apparatus of claim 1, wherein the BDT policy is associated with the WTRU or a group of WTRUs comprising the WTRU.

8. The apparatus of claim 1, wherein the BDT policy is associated with an application or a group of applications.

9. The apparatus of claim 1, wherein the processor and memory are further configured to determine a location associated with the BDT policy.

10. The apparatus of claim 1, wherein the processor and memory are configured to receive the notification from an access and mobility management function (AMF).

11. The apparatus of claim 1, wherein the database comprises a unified data repository.

12. The apparatus of claim 1, wherein the sending the request is in response to a request received by a second apparatus.

13. The apparatus of claim 12, wherein the second apparatus comprises a policy control function (PCF).

14. A method comprising:
    sending, to a database, a request for first information indicating a background data transfer (BDT) policy for a wireless transmit/receive unit (WTRU);
    receiving, from the database, a response comprising second information indicating the BDT policy and a location associated with the BDT policy;
    receiving a notification when the WTRU enters the location; and
    sending, as part of a UE route selection policy (URSP) and based on the received notification, to the WTRU, a message indicating the BDT policy for a data transfer and a data network to service the data transfer.

15. The method of claim 14, wherein the database comprises a unified data repository.

16. The method of claim 14, wherein the notification is received from an access and mobility management function (AMF).

* * * * *